United States Patent
Yang et al.

(10) Patent No.: US 9,681,224 B2
(45) Date of Patent: Jun. 13, 2017

(54) BROADCAST RECEIVING APPARATUS AND AUDIO OUTPUT METHOD THEREOF

(71) Applicant: SAMSUNG ELECTRONICS CO., LTD., Suwon-si, Gyeonggi-do (KR)

(72) Inventors: Hyun Sik Yang, Seongnam-si (KR); Ji Hui Park, Suwon-si (KR); Yoon Il, Gunpo-si (KR); Soo Han Kim, Seoul (KR); Young Joon Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 52 days.

(21) Appl. No.: 14/728,260

(22) Filed: Jun. 2, 2015

(65) Prior Publication Data
US 2015/0350773 A1    Dec. 3, 2015

Related U.S. Application Data

(60) Provisional application No. 62/007,116, filed on Jun. 3, 2014.

(30) Foreign Application Priority Data

Jun. 30, 2014  (KR) .................. 10-2014-0080378
Feb. 6, 2015   (KR) .................. 10-2015-0018894

(51) Int. Cl.
*H04B 3/00*     (2006.01)
*H04R 3/00*     (2006.01)
(Continued)

(52) U.S. Cl.
CPC .............. *H04R 3/00* (2013.01); *H04N 21/439* (2013.01); *H04N 21/43615* (2013.01);
(Continued)

(58) Field of Classification Search
CPC ............... H04R 3/00; H04N 21/43635; H04N 21/43615; H04N 21/439; H04N 21/44227
See application file for complete search history.

(56) References Cited

U.S. PATENT DOCUMENTS

2002/0052732 A1   5/2002  Akita
2005/0073518 A1   4/2005  Bontempi
(Continued)

FOREIGN PATENT DOCUMENTS

EP    1 954 038      8/2008
JP    2011-130060    6/2011
(Continued)

OTHER PUBLICATIONS

YHT-S401 (SR-301 + NS-BR301) Yamaha Home Theater Package (XP-002745176) Oct. 19, 2012.
(Continued)

*Primary Examiner* — Regina N Holder
(74) *Attorney, Agent, or Firm* — Nixon & Vanderhye P.C.

(57) ABSTRACT

Provided are a broadcast receiving apparatus and an audio output method thereof, and more particularly, a broadcast receiving apparatus and an audio output method thereof in which an audio included in a broadcast signal that is received through a selected broadcast channel and then decoded is output to a built-in speaker. Some embodiments provide a broadcast receiving apparatus and an audio output method thereof in which, among audio, video, and/or additional information included in a broadcast signal received through a selected broadcast channel corresponding to a control signal received from a remote controller, the audio is selectively output in response to status information of a connected display apparatus.

20 Claims, 19 Drawing Sheets

(51) Int. Cl.
*H04N 21/436* (2011.01)
*H04N 21/4363* (2011.01)
*H04N 21/439* (2011.01)
*H04N 21/442* (2011.01)

(52) U.S. Cl.
CPC . *H04N 21/43635* (2013.01); *H04N 21/44227* (2013.01); *H04R 2420/07* (2013.01); *H04R 2499/15* (2013.01)

(56) References Cited

U.S. PATENT DOCUMENTS

| | | |
|---|---|---|
| 2006/0089735 A1 | 4/2006 | Atkinson |
| 2007/0117533 A1 | 5/2007 | Han et al. |
| 2007/0133812 A1 | 6/2007 | Yoshizawa et al. |
| 2007/0266400 A1 | 11/2007 | Rogers et al. |
| 2009/0141170 A1 | 6/2009 | Asayama et al. |
| 2012/0169932 A1* | 7/2012 | Kim ................. G08C 17/02 348/563 |
| 2013/0258200 A1* | 10/2013 | Kobayashi ............. H04N 9/67 348/660 |
| 2015/0103253 A1* | 4/2015 | Higuchi .......... H04N 21/43615 348/705 |

FOREIGN PATENT DOCUMENTS

| WO | WO 2009/109841 | 9/2009 |
|---|---|---|
| WO | WO 2012/144759 | 10/2012 |

OTHER PUBLICATIONS

EP International Search Report (15170540.7) dated Oct. 12, 2015.
PCT International Search Report (PCT/KR2015/005528) dated Sep. 3, 2015.

* cited by examiner

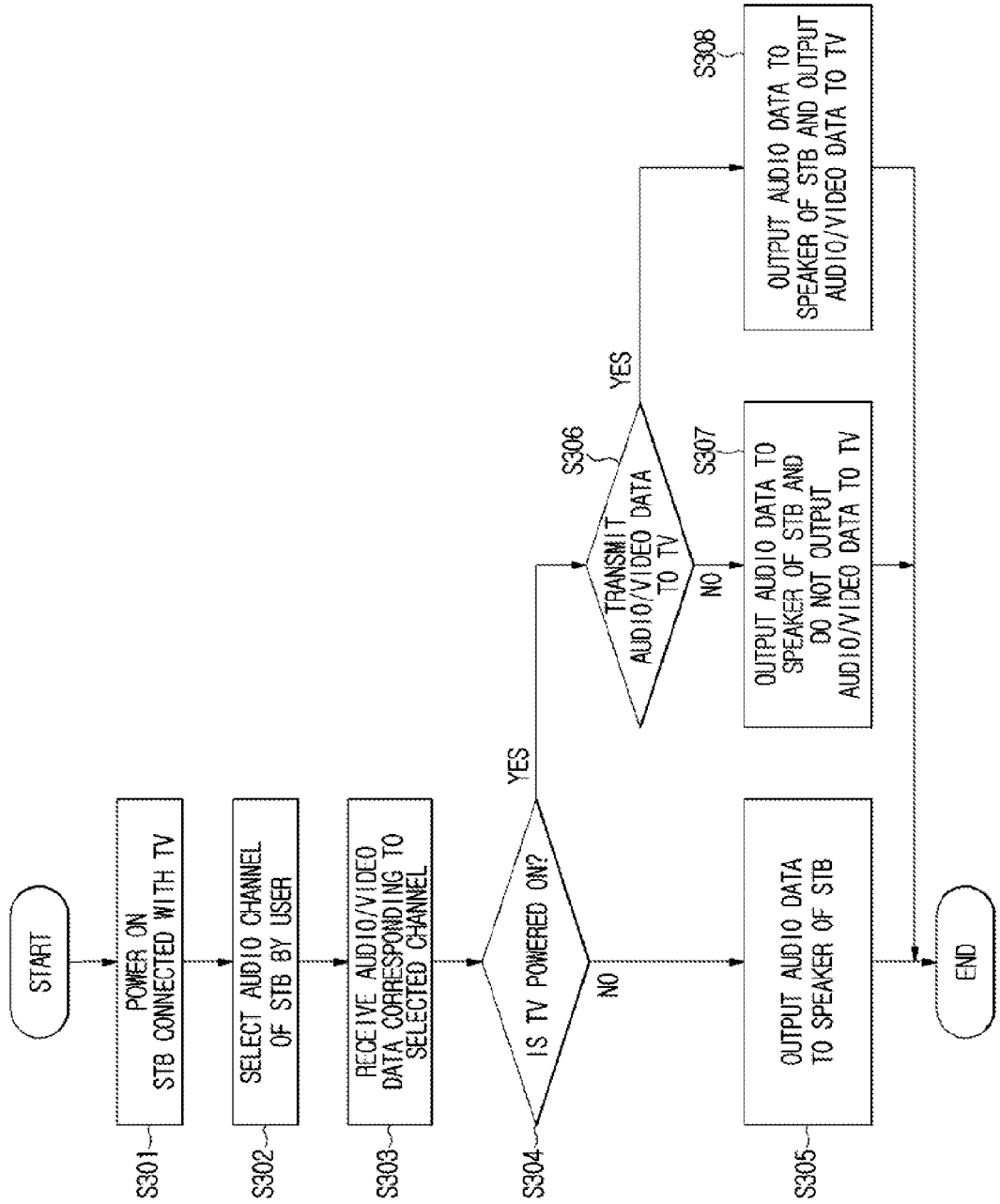

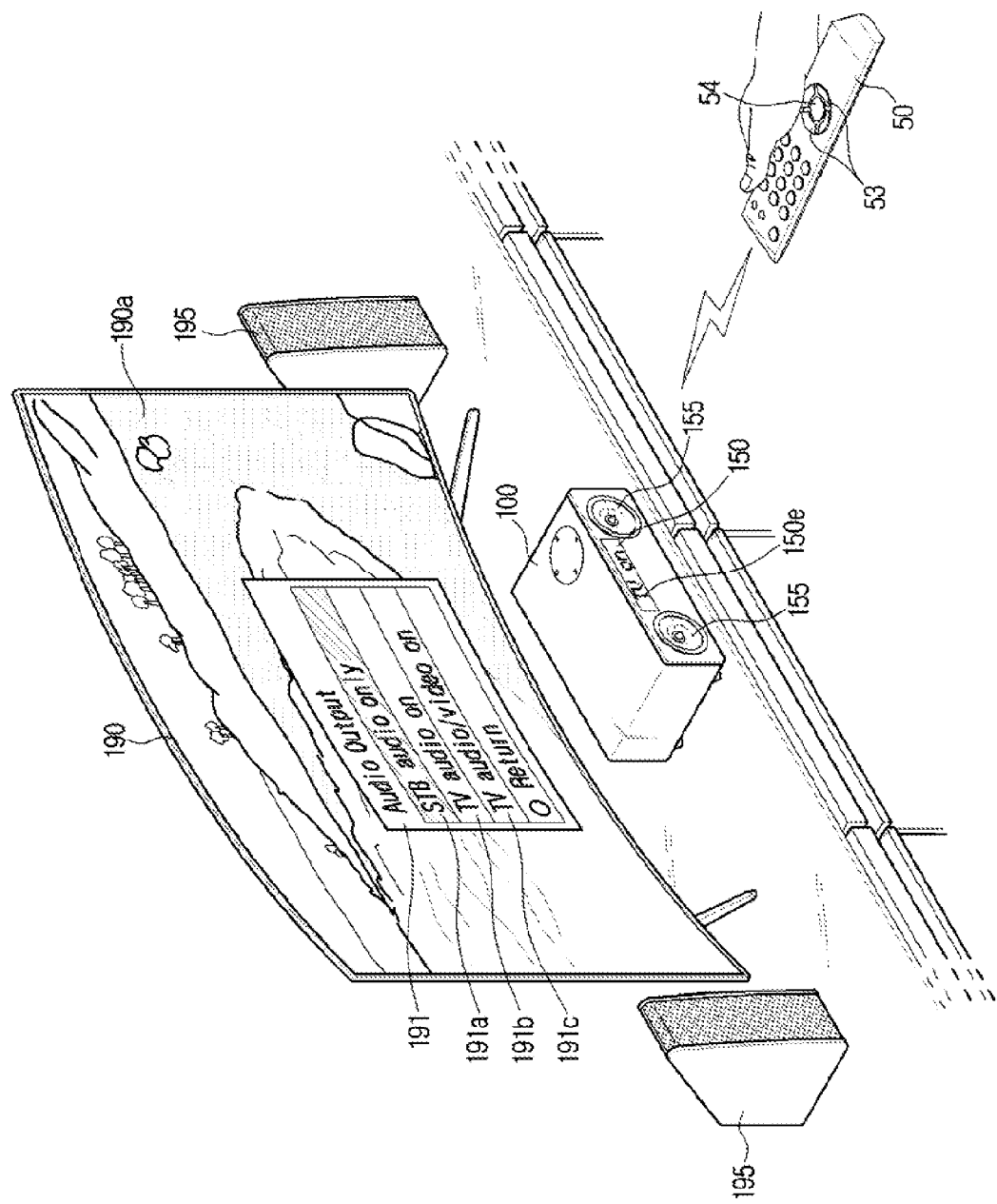

BROADCAST RECEIVING APPARATUS AND AUDIO OUTPUT METHOD THEREOF

CROSS-REFERENCE TO RELATED APPLICATIONS

This application claims the benefit of Korean Patent Application Nos. 10-2014-0080378 and 10-2015-0018894, filed on Jun. 30, 2014 and Feb. 6, 2015, respectively, in the Korean Intellectual Property Office and U.S. Provisional Patent Application No. 62/007,116, filed on Jun. 3, 2014 in the U.S. Patent and Trademark Office, the disclosures of which are incorporated herein by reference in their entireties.

BACKGROUND

1. Field

Embodiments of the present disclosure relate to a broadcast receiving apparatus and an audio output method thereof, and more particularly, to a broadcast receiving apparatus and an audio output method thereof in which audio information of a selected broadcasting channel is selectively output to at least one of a built-in speaker of the broadcast receiving apparatus and a built-in speaker of a display apparatus connected to the broadcast receiving apparatus in response to status information of the display apparatus.

2. Description of the Related Art

In order to watch digital broadcasts, a broadcast receiving apparatus may be connected to a display apparatus. A user may use a remote controller to wirelessly control a broadcast receiving apparatus. A user may also purchase video on demand or perform web browsing using a remote controller.

A display apparatus may output audio in stereo. Audio quality of a digital broadcast received through a broadcast receiving apparatus may be determined by an audio performance of the display apparatus.

SUMMARY

In accordance with one example embodiment of the present disclosure, a broadcast receiving apparatus includes a tuner unit, an input/output unit connected to a display apparatus, a built-in speaker, and a control unit configured to control the tuner unit, the input/output unit, and the built-in speaker, in which the control unit decodes a broadcast signal received through the tuner unit and outputs audio information included in the decoded broadcast signal to the built-in speaker of the broadcast receiving apparatus in response to a power-off status of the display apparatus detected through the input/output unit.

The control unit may detect the power-off status of the display apparatus using consumer electronics control (CEC).

In accordance with another example embodiment of the present disclosure, a broadcast receiving apparatus includes a tuner unit, an input/output unit connected to a display apparatus, a built-in speaker, and a control unit configured to control the tuner unit, the input/output unit, and the speaker, in which the control unit decodes a broadcast signal received through the tuner unit, selectively outputs audio information included in the decoded broadcast signal to the display apparatus and the built-in speaker of the broadcast receiving apparatus connected through the input/output unit. The control unit outputs the audio included in the decoded broadcast signal only to the built-in speaker of the broadcast receiving apparatus when the display apparatus is powered off and outputs the audio included in the decoded broadcast signal to the display apparatus and the built-in speaker of the broadcast receiving apparatus when the display apparatus is powered on.

The input/output unit may be connected to an additional speaker, and the control unit may selectively output the audio included in the decoded broadcast signal to the built-in speaker of the broadcast receiving apparatus, the additional speaker, and a built-in speaker of the display apparatus.

In accordance with another example embodiment of the present disclosure, an audio output method of a broadcast receiving apparatus includes receiving and decoding a broadcast signal in response to a broadcast channel selected on the broadcast receiving apparatus connected to a display apparatus and having a built-in speaker, detecting a power-off status of the display apparatus, and outputting audio information included in the decoded broadcast signal to the built-in speaker in response to the detected power-off status of the display apparatus, in which the power-off status of the display apparatus is detected using consumer electronics control (CEC).

In accordance with another example embodiment of the present disclosure, a broadcast receiving apparatus includes a tuner unit, an input/output unit connected to a display apparatus, a built-in speaker, and a control unit configured to control the tuner unit, the input/output unit, and the built-in speaker, in which the control unit decodes a broadcast signal received through the tuner unit and selectively outputs audio information included in the decoded broadcast signal to at least one speaker among audio output units in response to a status information of the display apparatus detected through the input/output unit.

The audio output units may include, for example, the built-in speaker of the broadcast receiving apparatus, an additional speaker connected to the broadcast receiving apparatus, a built-in speaker of the display apparatus, or an additional speaker connected to the display apparatus.

In accordance with another example embodiment of the present disclosure, a broadcast receiving apparatus includes a tuner unit, an input/output unit connected to a display apparatus, a built-in speaker, and a control unit configured to control the tuner unit, the input/output unit, and the built-in speaker, in which the control unit processes a broadcast signal received through the tuner unit and outputs audio information included in the processed broadcast signal to one of the built-in speaker and the display apparatus having a speaker in response to a user selection received through a remote controller.

In accordance with another example embodiment of the present disclosure, a broadcast receiving apparatus includes a tuner unit, an input/output unit connected to a display apparatus, a built-in speaker, and a control unit configured to control the tuner unit, the input/output unit, and the built-in speaker, in which the control unit processes a broadcast signal received through the tuner unit and outputs audio information included in the processed broadcast signal to both of the built-in speaker and the display apparatus having a speaker in response to a user selection received through a remote controller.

In accordance with another example embodiment of the present disclosure, a broadcast receiving apparatus includes a tuner unit, an input/output unit connected to a display apparatus, a built-in speaker, and a control unit configured to control the tuner unit, the input/output unit, and the built-in speaker, in which the control unit processes a broadcast signal received through the tuner unit and outputs audio information included in the processed broadcast signal to at least one of the built-in speaker and the display apparatus having a speaker in response to a user selection.

The control unit may output the audio included in the processed broadcast signal to at least one of the built-in speaker and the display apparatus having a speaker in response to a user selection received through a remote controller.

BRIEF DESCRIPTION OF THE DRAWINGS

These and/or other aspects of the example embodiments will become apparent and more readily appreciated from the following description of the example embodiments, taken in conjunction with the accompanying drawings of which:

FIG. 3 is a schematic flowchart illustrating an audio output method of a broadcast receiving apparatus according to an example embodiment;

FIGS. 5A to 5C are views illustrating an example of an audio output method of a broadcast receiving apparatus according to another example embodiment;

DETAILED DESCRIPTION

Figure 1:
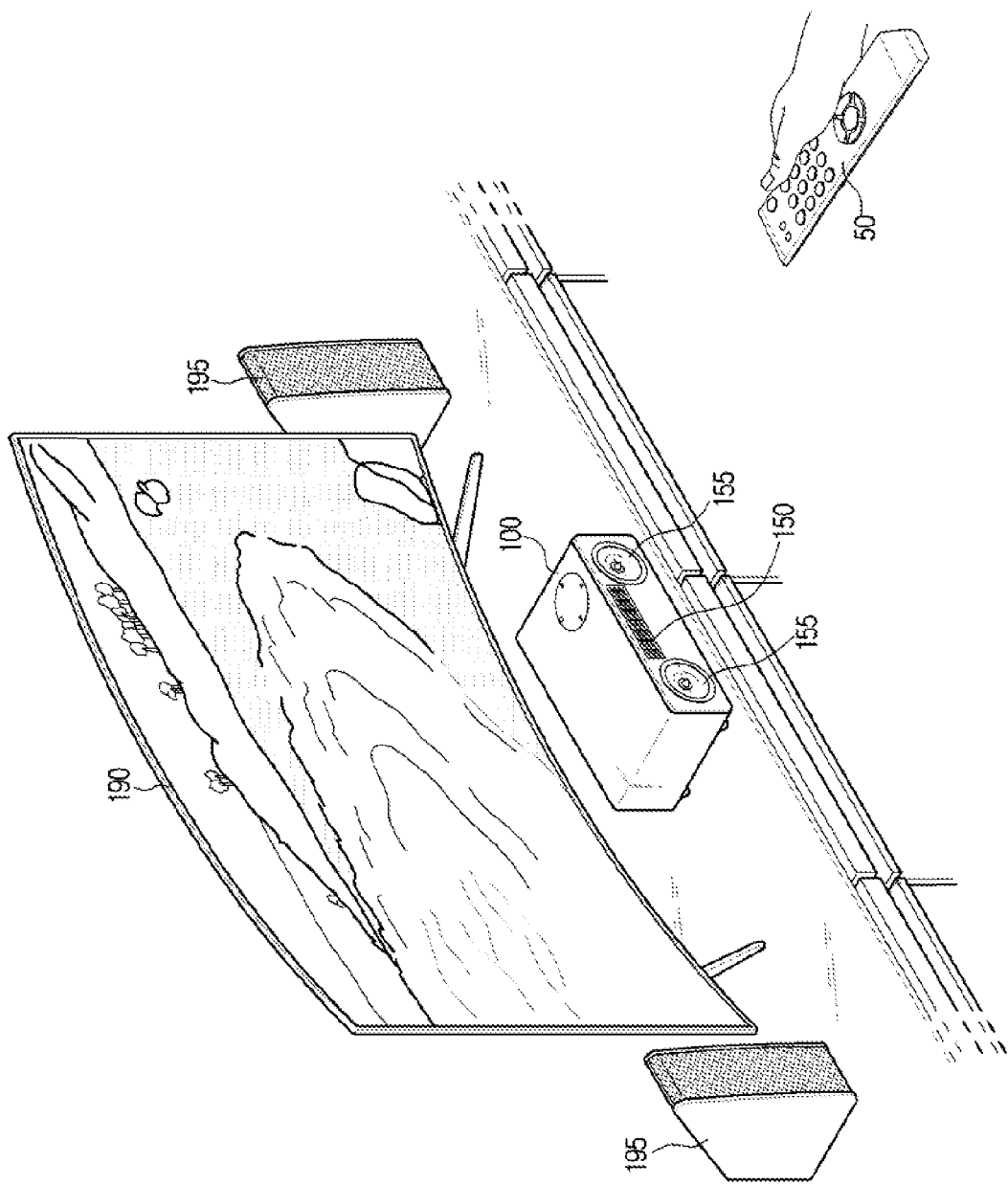
FIG. 1 is a schematic view illustrating operations among a remote controller, a broadcast receiving apparatus, and a display apparatus according to an example embodiment.

Hereinafter, example embodiments will be described in detail with reference to the accompanying drawings in which like reference numerals refer to like elements throughout. Further, methods of using an electronic device according to example embodiments will be described in detail with reference to the accompanying drawings.

Although the terms first, second, etc., may be used herein to describe various elements, these elements should not be limited by these terms. These terms are only used to distinguish one element from another. For example, a first element may be called a second element, and a second element may also be called a first element without departing from the scope of the disclosure. The term 'and/or' means any one or a combination of a plurality of related and described items.

The term "selection of a key that is positioned on a remote controller" may be used to indicate a press of a key or a touch of a key.

Content received through a communication unit or an input/output unit may include, for example, and without limitation, a video, image, text, or web document.

Power-off of a display apparatus may include a state in which a power plug of the display apparatus is connected to a power source (e.g., an outlet). When the display apparatus having a power plug connected to a power source is powered off, the display apparatus may be supplied with power (e.g., powered off) by a power key (or a power button) of a remote controller.

An audio output unit may include, for example, a built-in speaker of a broadcast receiving apparatus, an additional speaker connected to the broadcast receiving apparatus, a built-in speaker of the display apparatus, or an additional speaker connected to the display apparatus.

The terminology used herein is for the purpose of describing particular example embodiments only, and is not intended to limit the scope of the disclosure. The singular forms "a," "an," and "the" include plural referents unless the context clearly dictates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

FIG. 1 is a schematic view illustrating operations among a remote controller, a broadcast receiving apparatus, and a display apparatus according to an example embodiment.

Referring to FIG. 1, a remote controller 50 and a display apparatus 190 connected to a broadcast receiving apparatus 100 having a built-in speaker(s) 155 are illustrated. In addition, one or more additional speakers 195 in the vicinity of the display apparatus 190 are illustrated.

The remote controller 50 may control the broadcast receiving apparatus 100 and/or the display apparatus 190 through short-range communication such as, for example, infrared (IrDA), Bluetooth, or the like. A user may use a key (including a button), a touch pad, a microphone (not shown) for receiving the user's voice, or a sensor for recognizing a motion of the remote controller 50, which are provided in the remote controller 50, to control functions of the broadcast receiving apparatus 100 and/or the display apparatus 190.

A user may use the remote controller 50 to power on/off, change a channel on, adjust volume of, select a terrestrial broadcast/cable broadcast/satellite broadcast on, or set a configuration of the broadcast receiving apparatus 100. In addition, a user may use the remote controller 50 (or another remote controller (not shown)) to power on/off, change a channel on, adjust volume of, select a source on, or search for a content item (for example, an application, a video, or a web).

A user may use the remote controller 50 to output audio received from an audio channel selected on the broadcast receiving apparatus 100 through at least one of a built-in speaker 155 of the broadcast receiving apparatus 100, a built-in speaker (not shown) of the display apparatus 190, and an additional speaker 195. The additional speaker 195 may be connected to the broadcast receiving apparatus 100. In addition, the additional speaker 195 may be connected to the display apparatus 190.

The display apparatus 190 is connected to the broadcast receiving apparatus 100. The display apparatus 190 may include, for example, a flat display apparatus, a curved display apparatus having a curved screen, or a flexible display apparatus that can adjust its curvature.

An output resolution of the display apparatus 190 may include, for example, a high definition (HD), full HD, and ultra HD output resolution. A diagonal length of a screen of the display apparatus 190 may be, for example, 650 mm or less, 660 mm, 800 mm, 1,010 mm, 1,520 mm, 1,890 mm or 2,000 mm or greater. A width and length of (the display apparatus 190 or) the screen of the display apparatus 190 may be, for example, 643.4 mm×396.5 mm, 934.0 mm×548.6 mm, 1,670.2 mm×962.7 mm, or 2,004.3 mm×1, 635.9 mm. Alternatively, a vertical/horizontal ratio of the display apparatus 190 may be, for example, 4:3, 16:9, 16:10, 21:9, or 21:10.

It will be readily understood by those skilled in the art that the number of built-in speakers 155 and the number of speakers 195 connected may be changed depending on the performance or structure of the broadcast receiving apparatus 100.

The term "user" used herein indicates a person who uses the remote controller 50 to control a function or operation of the broadcast receiving apparatus, and may include a user, a manager, or an installation engineer.

Figure 2:
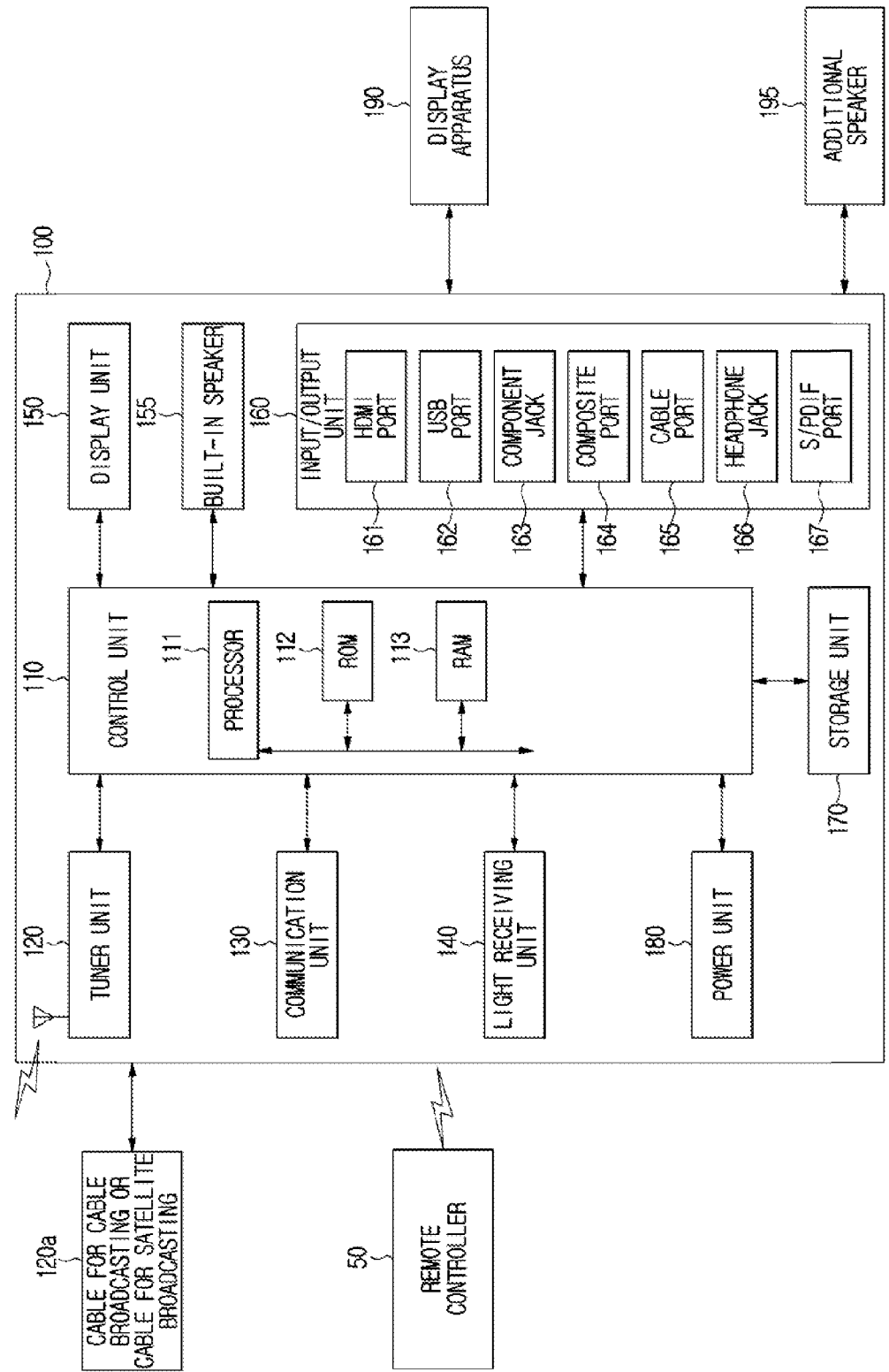
FIG. 2 is a block diagram illustrating a broadcast receiving apparatus according to an example embodiment.
Figure 11:
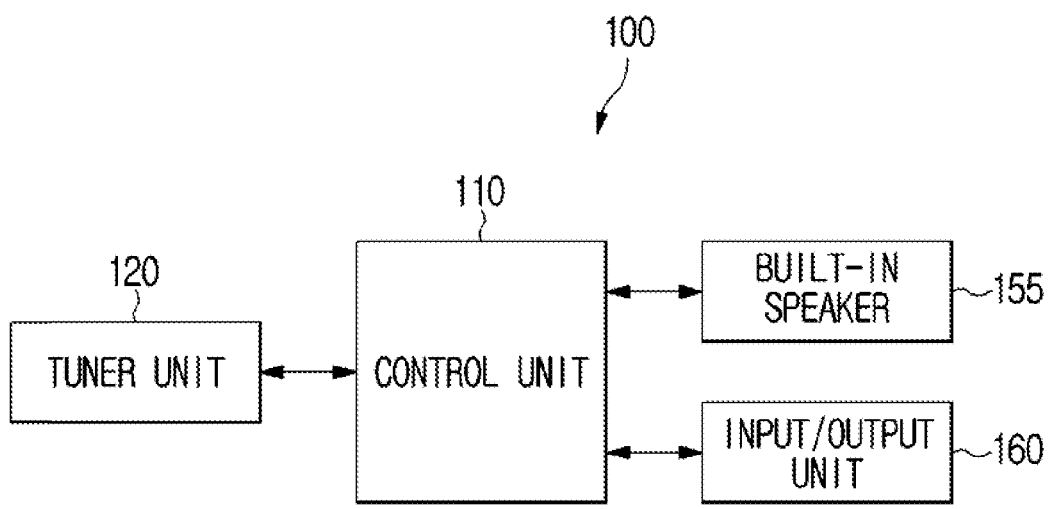
FIG. 11 is a block diagram illustrating a broadcast receiving apparatus according to an example embodiment.

FIGS. 2 and 11 are block diagrams illustrating a broadcast receiving apparatus according to an example embodiment.

Figure 10:
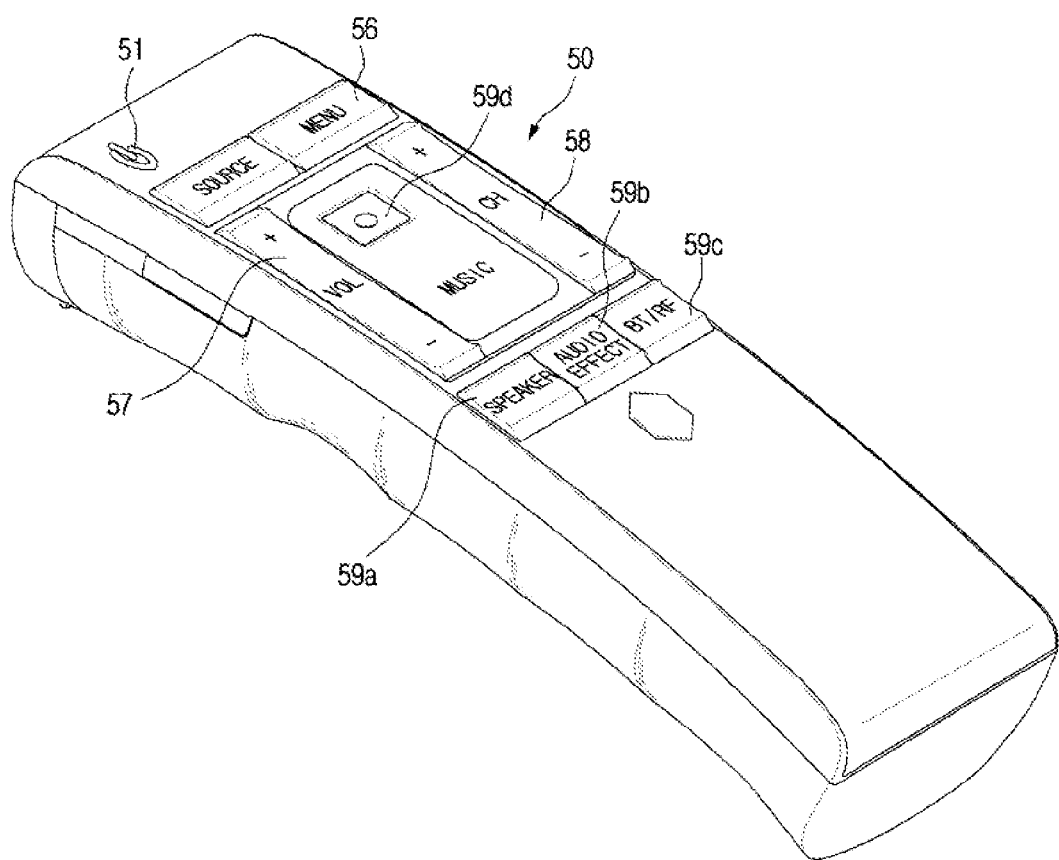
FIG. 10 is a view illustrating an example of a remote controller according to an example embodiment.

FIG. 10 is a view illustrating an example of a remote controller according to an example embodiment.

Referring to FIGS. 2 and 11, the broadcast receiving apparatus 100 that receives a control signal from the remote controller 50 may be connected to an external apparatus (not shown) using an input/output unit in a wired/wireless manner. The external apparatus may include, for example, a display apparatus 190, the additional speaker 195, a cell phone (not shown), a smartphone (not shown), a tablet PC (not shown), and a server (not shown).

The broadcast receiving apparatus 100 denotes a signal conversion apparatus for receiving a terrestrial broadcast signal, a cable broadcast signal, or a satellite broadcast signal to allow a user to watch the broadcast through the display apparatus connected thereto (e.g., a TV). The broadcast receiving apparatus 100 may decode the broadcast signal received through a tuner, convert the decoded broadcast signal into audio, video, and/or additional information, and output the converted audio, video, and/or additional information to the display apparatus 190. In addition, the broadcast receiving apparatus 100 may demodulate a received digital signal (e.g., compressed in an MPEG-N format (N is a positive real number)), decompress and separate the demodulated signal into audio, video, and additional information, and output the audio, video, and additional information to the display apparatus 190.

The broadcast receiving apparatus 100 may output the separated audio, video, and/or additional information to the display apparatus 190 connected thereto. The broadcast receiving apparatus 100 may output the separated audio to the built-in speaker 155. The broadcast receiving apparatus 100 may output the separated additional information to the display unit 150. In addition, the broadcast receiving apparatus 100 may output the separated audio to the additional speaker 195 connected thereto. The broadcast receiving apparatus 100 may receive information delivered through an Ethernet or a phone network.

The broadcast receiving apparatus 100 may include a converter that converts an analog signal into a digital signal. In addition, the broadcast receiving apparatus 100 may include an electronic device for receiving an Internet protocol television (IPTV) service (e.g., content related to web browsing, video on demand, or the like) of a broadcaster. It will be readily understood by those skilled in the art that the broadcast receiving apparatus 100 may be implemented as a set-top box, but the present disclosure is not limited thereto.

The broadcast receiving apparatus 100 may be electrically connected to an external apparatus (not shown) having a tuner unit. In addition, the broadcast receiving apparatus 100 may include a sensor (not shown, e.g., an illumination sensor, a temperature sensor, etc.) that detects an internal or external state of the broadcast receiving apparatus 100.

It will be readily understood by those skilled in the art that the display apparatus 190 connected to the broadcast receiving apparatus 100 may be implemented, for example, as an analog TV, a digital TV, a 3D TV, a smart TV, an LED TV, an OLED TV, a plasma TV, or a monitor, but the present disclosure is not limited thereto.

It will be readily understood by those skilled in the art that the additional speaker 195 connected to the broadcast receiving apparatus 100 may be implemented, for example, as a 2-channel, 2.1-channel, 4-channel, 4.1-channel, 5.1-channel, 6.1-channel, 7.1-channel, 9.1-channel, or 11.2-channel speaker, but the present disclosure is not limited thereto. For example, when the built-in speaker 155 of the broadcast receiving apparatus 100 is a 2.1-channel speaker and the additional speaker 195 is 3-channel speaker (a sub-woofer speaker, 2-channel rear speaker), an audio output of the broadcast receiving apparatus 100 may be a 5.1-channel output. The broadcast receiving apparatus 100 may provide a user with various audio output effects (for example, a soccer field, a theater, a concert hall, an orchestra hall, etc.) corresponding to the number of the speakers 155 and the number of additional speakers 195.

Referring to FIG. 11, the broadcast receiving apparatus 100 may include a tuner unit 120, a built-in speaker 155, an input/output unit 160 and a control unit 110. The broadcast receiving apparatus 100 may be implemented using a larger number of components than the number of components shown in FIG. 11. In addition, the broadcast receiving apparatus 100 may be implemented using a smaller number of components than the number of components shown in FIG. 11.

Components of the broadcast receiving apparatus 100 will be described in detail below with reference to FIG. 2.

Referring to FIG. 2, the broadcast receiving apparatus 100 includes a tuner unit 120, a communication unit 130, a light receiving unit 140, a display unit 150, a built-in speaker 155, an input/output unit 160, a storage unit 170, and a power unit 180.

A control unit 110 may include a processor 111, a read only memory (ROM) 112 that stores a control program for controlling the broadcast receiving apparatus 100, and a random access memory (RAM) 113 that stores a signal or data received from outside the broadcast receiving apparatus 100 or is used as storage areas corresponding to various tasks performed by the broadcast receiving apparatus 100.

The control unit 110 serves to control an overall operation of the broadcast receiving apparatus 100, a signal flow between internal components 120 to 180 of the broadcast receiving apparatus 100, and to process data. The control unit 110 controls power supplied from the power unit 180 to the internal components 120 to 180. In addition, when there is a user input or a predetermined and stored condition is satisfied, the control unit may run an operation system and various applications that are stored in the storage unit 170.

The processor 111 may include a graphic processing unit (not shown) for performing a graphical processing operation corresponding to an image or video. The processor 111 may be implemented as a system on chip (SoC) including a core (not shown) and a graphic processing unit (not shown). The processor 111 may include a single core, and a dual core, a triple core, a quad cure, multi-cores.

The processor 111 may include a plurality of processors, for example, a main processor (not shown) and a subprocessor (not shown) operating in a sleep mode. Further, the processor 111, the ROM 112, and the RAM 113 may be connected to each other via an internal bus.

In an example embodiment, the term "controller" includes the processor 111, the ROM 112, and the RAM 113.

The control unit 110 may control a tuner unit, an input/output unit, and a built-in speaker. The control unit may decode a broadcast signal received through the tuner unit and output audio included in the decoded broadcast signal to the built-in speaker in response to the status information (e.g., power on/off) of the display apparatus detected through the input/output unit.

The control unit 110 may control a tuner unit, an input/output unit, and a built-in speaker. The control unit may decode a broadcast signal received through the tuner unit and selectively output audio information included in the decoded signal to at least one of the built-in speaker, the additional speaker, and the display apparatus in response to the status information of the display apparatus detected through the input/output unit.

The control unit 110 may decode content received through the communication unit and output audio information included in the decoded content to the built-in speaker in response to the status information of the display apparatus detected through the input/output unit.

The control unit 110 may control the broadcast receiving apparatus in response to a control signal received through the light receiving unit.

The control unit 110 may allow the display of some of the additional information included in the decoded broadcast signal on the display unit in response to the detected status information of the display apparatus.

The control unit may detect the status information of the display apparatus using consumer electronics control (CEC).

The control unit 110 may selectively output audio information included in the decoded broadcast signal to the built-in speaker, the additional speaker, and a built-in speaker of the display apparatus in response to the detected status information of the display apparatus.

The control unit 110 may output the decoded audio in response to the number of speakers and the number of additional speakers.

When the status information of the display apparatus indicates a power-on state, the control unit 110 may output the decoded broadcast signal to the display apparatus to display video included in the decoded broadcast signal on a screen of the display apparatus and output audio information included in the decoded broadcast signal to a speaker of the display apparatus.

The control unit 110 may selectively output additional information included in the decoded broadcast signal to be displayed on one of the screen of the display apparatus and the display unit.

When the status information of the display apparatus indicates a power-on state, the control unit 110 may output only audio information included in the decoded broadcast signal to the built-in speaker of the display apparatus.

The control unit 110 may provide one of a visual feedback and an acoustic feedback which are provided in response to the output of the audio included in the decoded broadcast signal to the built-in speaker.

The control unit 110 may control a tuner unit, the input/out unit, and the speaker. The control unit 110 may decode a broadcast signal received through the tuner unit and selectively output audio included in the decoded broadcast signal to the built-in speaker and the built-in speaker of the display apparatus in response to the status information of the display apparatus detected through the input/output unit. When the status information of the display apparatus indicates a power-off state, the control unit outputs the audio included in the decoded broadcast signal only to the built-in speaker. When the status information of the display apparatus indicates a power-on state, the control unit outputs the audio included in the decoded broadcast signal to the built-in speaker and the built-in speaker of the display apparatus.

The control unit 110 may selectively output the audio included in the decoded broadcast signal to the built-in speaker, the additional speaker, and the built-in speaker of the display apparatus.

The control unit 110 may control a tuner unit, an input/output unit connected to a display apparatus, and a built-in speaker. The control unit processes a broadcast signal received through the tuner unit and outputs audio information included in the processed broadcast signal to one of the built-in speaker and the display apparatus having a speaker in response to a user selection received through a remote controller.

The control unit 110 may control a tuner unit, an input/output unit connected to a display apparatus, and a built-in speaker and performs control such that a broadcast signal received through the tuner unit is processed and audio information included in the processed broadcast signal is output to one of the built-in speaker and the display apparatus having a speaker in response to a user selection received through a remote controller.

It will be readily understood by those skilled in the art that a configuration and an operation of the broadcast receiving apparatus 100 may be implemented in various ways according to an example embodiment.

The tuner unit 120 may conduct amplification, mixing, or resonance on a broadcast signal received by a cable (120*a*) or wirelessly to tune and select only a frequency of a channel selected by the broadcast receiving apparatus 100 from among many radio wave components. The broadcast signal includes video, audio, and/or additional information (e.g., electronic program guide (EPG)).

The tuner unit 120 may receive a broadcast signal in a frequency band corresponding to a channel number (e.g., channel 632 which is an audio channel broadcast) in response to a user input (e.g., a control signal including a channel number input, a channel up or down input, and a channel input on an EPG screen, which is received from the remote controller 50).

The tuner unit 120 may receive a broadcast signal from various sources, such as terrestrial broadcasting, cable broadcasting, or satellite broadcasting. The tuner unit 120 may receive a broadcast signal from sources such as analog broadcasting or digital broadcasting. For example, a digital signal transmission scheme may include quadrature amplitude modulation (QAM), orthogonal frequency division multiplexing (OFDM), vestigial side band (VSB), and quadrature phase shift keying (QPSK).

A digital broadcasting specification that can be received by the broadcast receiving apparatus 100 may include, for example, various transmission schemes such as terrestrial digital multimedia television broadcasting (DMB-T), advanced digital television broadcast-terrestrial (ADTB-T), BDB-T, CDTB-T, and synchronized multi-carrier CDMA (SMCC) in China in addition to an advanced television systems committee (ATSC) system in the United states, a DVB-T system based on coded orthogonal frequency modulation (COFDM) in Europe, an ISDB-T system based on bandwidth segmented transmission-OFDM (BST-OFDM) in Japan.

The tuner unit 120 may be integrally implemented with the broadcast receiving apparatus 100. In addition, the tuner unit 120 may be implemented as a separate device (not shown) having a tuner unit electrically connected to the broadcast receiving apparatus 100 or a separate unit (not shown) connected to the input/output unit 160.

A broadcast signal received through the tuner unit 120 is decoded through demodulation (e.g., audio decoding, video decoding, or additional information decoding) to be divided into audio, video, and/or additional information. The divided audio, video, and/or additional information may be stored in the storage unit 170 through control by the control unit 110.

The number of tuner units 120 of the broadcast receiving apparatus 100 may be one or more. For example, when a plurality of tuner units (120 and not shown) are provided, the control unit 110 may decode broadcast signals received through the tuner units and use the input/output unit 160 to output the decoded broadcast signals to the display apparatus 190 and another display apparatus (not shown). Furthermore, when the plurality of tuner units (120 and not shown) are provided, the control unit 110 may decode broadcast signals received through the tuner units and use the input/output unit 160 to output the decoded broadcast signals to the display apparatus 190 and to the display unit 150 and the built-in speaker 155.

The communication unit 130 may connect the broadcast receiving apparatus 100 to an external device (e.g., a content server (not shown)) by control of the control unit 110. The control unit 110 may retrieve or download various content or applications from the external device connected via the communication unit 130. The control unit 110 may perform web browsing through the external device connected via the communication unit 130.

The control unit 110 may selectively receive a broadcast signal using the tuner unit 120 and the communication unit 130. In addition, the control unit 110 may receive respective broadcast signals using the tuner unit 120 and the communication unit 130. For example, the control unit 110 may decode content (e.g., a video) downloaded through the communication unit 130 to output the decoded content to the display apparatus 190. The control unit 110 may decode a broadcast signal (e.g., audio, video, and/or additional information) received through the tuner unit 120 and output the decoded broadcast signal to the display unit 150 and the built-in speaker 155.

The communication unit 130 may include a wired Ethernet (not shown) depending on the performance and structure of the broadcast receiving apparatus 100. In addition, the communication unit 130 may include a wireless LAN (now shown) or Bluetooth (not shown) depending on the performance and structure of the broadcast receiving apparatus 100. Furthermore, the communication unit 130 may further include a short-range communication (e.g., near field communication (NFC; (not shown)) and a Bluetooth low energy (BLE (not shown)) in addition to Bluetooth.

A microphone unit (not shown) may receive a voice uttered by a user. The microphone unit (not shown) may convert the received voice into an electrical signal and output the electrical signal to the control unit 110. The user's voice may include, for example, a voice corresponding to a menu or function of the broadcast receiving apparatus 100. A recognition range of the microphone unit (not shown) may be recommended, for example, as a distance of 4 meters or less from the microphone unit 240 to the user's position, and a recognition range of the microphone unit 240 may vary depending on a level of the user's voice and surrounding environments (e.g., a speaker sound, ambient noise, or the like).

The microphone unit (not shown) may be implemented integrally with or separated from the broadcast receiving apparatus 100. A separated microphone unit (not shown) may be electrically connected to the broadcast receiving apparatus 100 through the communication unit 130 or the input/output unit 160.

A camera unit (not shown) may receive an image (e.g., consecutive frames) corresponding to the user's motion including a gesture in a camera recognition range. For example, the recognition range of the camera unit (not shown) may, for example, be a distance of 0.5 m to 5 m from the camera unit to the user. The user's motion may include, for example, a body part of a user, such as a face, a hand, a fist, or a finger of the user, a facial expression or a motion of the body part of the user. The camera unit (not shown) may convert the received image into an electrical signal and output the electrical signal to the control unit 110 through control by the control unit 110.

The control unit 110 may use the received motion recognition result to select a menu displayed on the broadcast receiving apparatus 100 or perform control corresponding to the motion recognition result. For example, the control may include channel adjustment, volume adjustment, and indicator movement.

The camera unit (not shown) may be configured with a lens (not shown) and an image sensor (not shown). The camera unit (not shown) may use a plurality of lenses and image processing to support optical zoom or digital zoom. A recognition range of the camera unit (not shown) may be set variously depending on an angle condition and an ambient environment condition of the camera. When a plurality of camera units (not shown) are provided, a 3D still image or a 3D motion image may be received using a second camera (not shown) adjacent to a first camera (not shown) (e.g., a distance between the first camera and the second camera is greater than 20 mm and less than 80 mm).

The camera unit (not shown) may be implemented integrally with or separated from the broadcast receiving apparatus 100. An apparatus including the separated camera unit (not shown) may be electrically connected to the broadcast receiving apparatus 100 through the communication unit 130 or the input/output unit 160.

The light receiving unit 140 receives an optical signal (including a control signal) received from the external remote controller 50 through an optical window (not shown). The light receiving unit 140 may receive an optical signal corresponding to the user input (e.g., a touch, press, touch gesture, voice, or motion) from the remote controller 50. The received optical signal may be converted and transmitted to the control unit 110. In addition, the control signal may be extracted from the optical signal received by the control unit 110.

The display unit 150 may display at least one of the decoded video and additional information through control by the control unit 110. For example, the display unit 150 may display the video and additional information (e.g., a channel number, a channel name, a genre, a song title, and a volume level, which correspond to a broadcasting program). In addition, the display unit 150 may display only the additional information (e.g., a channel number, a channel name, a genre, a song title, and a volume level). The display unit 150 may display recommended content (e.g., a broadcasting program name), a broadcasting time, or channel information that are provided in the form of a press service. For example, the display unit 150 may display "Today's Featured Music broadcast at 6 PM on Ch. 11" through control by the control unit 110. The display unit 150 may display information regarding an advertisement or broadcast-related event (e.g., a promotion) that is provided by a broadcasting provider. For example, the display unit 150 may display "discount of 5,000 Korean won when subscribing to a child channel package for Christmas" through control by the control unit 110. In addition, the display unit 150 may display weather information provided by the broadcasting provider. For example, the display unit 150 may display "Seoul: Cloudy and 13 degrees Celsius" (for example, emoticon or icon enabled) through control by the control unit 110. Further, broadcast program information, a broadcasting time, or channel information of a broadcast program that is reserved by the user may be displayed. For example, the display unit 150 may display "Reserved program (9 O'clock News) will start at 9 pm in 10 minutes, Ch6" through control by the control unit 110.

The control unit 110 of the broadcast receiving apparatus 100 may display an equalizing mode (e.g., a music mode, a movie mode, or a sport mode) through the display unit 150. An audio output effect may include a movie mode, a music mode, a news mode, a sport mode, a normal mode, or a night mode (e.g., a volume is adjusted to a low level at night). In addition, an equalizing mode manually changed by a user (e.g., from a normal mode to a movie mode) may be displayed on the display unit 150 through control by the control unit 110.

The display unit 150 may include, for example, a liquid crystal display (LCD), an organic light-emitting diode (OLED), a plasma display panel (PDP), or a vacuum fluorescent display (VFD). It will be readily understood by those skilled in the art that the video and/or additional information that can be displayed may vary depending on the display scheme.

The display unit 150 may display a text, icon, or symbol (e.g., " " for a playback and "■" for a pause) corresponding to an external device (e.g., a portable terminal, memory card, or remote controller) connected to the broadcast receiving apparatus 100 through control by the control unit 110.

When a USB memory (not shown) which is a type of memory card is connected to the broadcast receiving apparatus 100, the display unit 150 may display a text of "USB ready" or "Song title" through control by the control unit 110.

When a portable terminal (not shown) is connected to the broadcast receiving apparatus 100 through short-range communication, the display unit 150 may display a text of "BT connected" or "NFC connected" through control by the control unit 110.

Further, when an optical signal output from the remote controller 50 is received by the light receiving unit 140 of the broadcast receiving apparatus 100, the display unit 150 may display a text, icon, or symbol corresponding to "Audio STB on" that powers on the broadcast receiving apparatus 100, "TV off" that powers off the display apparatus 190, "Ch No." that displays a selected channel number, "Vol level" that indicates volume to be adjusted, "STB audio only" that indicates an audio output mode of the broadcast receiving apparatus, or "EQ mode" that sets an equalizing mode of the broadcast receiving apparatus 100 through control by the control unit 110.

The text, icon, or symbol displayed on the display unit 150 may be moved in one direction through control by the control unit 110. The text, icon, or symbol displayed on the display unit 150 may flicker while be moved in one direction through control by the control unit 110.

The display unit 150 may display a video (e.g., a moving picture) received through the communication unit 130 or the input/output unit 160. The display unit 150 may output a video stored in the storage unit 170 through control by the control unit 110.

The display unit 150 according to an example embodiment may output a visual feedback corresponding to an event (e.g., status change such as power-on, power-off, or portable-terminal connection) of the broadcast receiving apparatus 100 through control by the control unit 110 of the broadcast receiving apparatus 100.

The built-in speaker 155 may output a decoded audio through control by the control unit 110. The built-in speaker 155 may output audio (e.g., a voice, music, and a sound) received through the communication unit 130 or the input/output unit 160. The built-in speaker 155 may be implemented as a 1-channel, 2-channel, or 2.1-channel speaker. It will be readily understood by those skilled in the art that the built-in speaker 155 may be implemented as a 4-channel, 4.1-channel, 5.1-channel, 6.1-channel, 7.1-channel, 9.1-channel, or 11.2-channel speaker, but the present disclosure is not limited thereto.

The control unit 110 may equalize the decoded audio corresponding to the decoded additional information (e.g., broadcast program information) and output the equalized audio to the built-in speaker 155. For example, when the broadcast program is a news channel, the control unit 110 may equalize the decoded audio to a mid-range (e.g., 250 to 4,000 Hz) of an audio frequency band (e.g., 20 to 20,000 Hz). The mid-range may be divided into a low-mid range (e.g., 250 to 2,000 Hz) and a high-mid range (e.g., 2,000 to 4,000 Hz).

When the broadcast program is classical music on a music channel, an action movie on a movie channel, or a soccer game on a sport channel, the control unit 110 may equalize the decoded audio corresponding to the additional information (e.g., a channel number, a channel name, or a genre). In addition, the user may manually change the equalization of the decoded audio. For example, when the broadcast channel is an action movie on a movie channel, the user may use an audio effect key (including an audio effect button) of the remote controller 50 and the broadcast receiving apparatus 100 to manually change the equalization (e.g., from a normal mode to a movie mode).

The control unit 110 may up-mix and output the decoded audio (corresponding to a 2.0 channel speaker) to a 5.1-channel or 7.1-channel speaker (e.g., a built-in speaker and an additional speaker). The control unit 110 may up-mix and output the decoded audio (corresponding to a 2.0 channel speaker) to a 4.0-channel, 4.1-channel, or 5.1-channel built-in speaker (155). In addition, the control unit 110 may down-mix and output the decoded audio (corresponding to a 7.1 channel speaker) to a 2-channel or 5.1-channel speaker (e.g., a built-in speaker and an additional speaker). The control unit 110 may down-mix and output the decoded audio (corresponding to a 7.1 channel speaker) to a 4.0-channel, 4.1-channel, or 5.1-channel built-in speaker (155). The control unit 110 may perform the output in consideration of the number of speakers corresponding to the decoded audio and the number of speakers connected to the broadcast receiving apparatus 100. For example, when the number of speakers corresponding to the decoded audio is a 7.1 channel format, the control unit 110 may output the audio in a 4.1 channel format in consideration of the built-in speaker 155 (e.g., 2.1 channel format) and the additional speaker 195 (e.g., 2 channel format) of the detected display apparatus 190.

The control unit 110 of the broadcast receiving apparatus 100 may provide various audio output effects (e.g., a concert hall, an orchestra hall, etc.) to a user, corresponding to the number of built-in speakers 155. The control unit 110 of the broadcast receiving apparatus 100 may provide various audio output effects (e.g., a concert hall, an orchestra hall, etc.) to a user in response to the total number of built-in speakers 155 and additional speakers 195 connected through the input/output unit 160.

The built-in speaker 155 may output audio information stored in the storage unit 170 through control by the control unit 110. The broadcast receiving apparatus 100 may output the audio through the input/output unit 160 to the outside. For example, the control unit 110 may output the audio to the additional speaker 195 or the display apparatus 190.

The built-in speaker 155 according to an example embodiment may output an acoustic feedback corresponding to an event (e.g., status change such as power-on, power-off, or portable-terminal connection) of the broadcast receiving apparatus 100 through control by the control unit 110 of the broadcast receiving apparatus 100. The built-in speaker 155 may output an acoustic feedback corresponding to a text, icon, or symbol displayed on the display unit 150 through control by the control unit 110 of the broadcast receiving apparatus 100.

The input/output unit 160 may receive video (e.g., a moving picture), audio (e.g., a sound or a music), and additional information (e.g., EPG) from outside the broadcast receiving apparatus 100 through control by the control unit 110. The input/output unit 160 may output, to the display apparatus 190 or the additional speaker 195, the video (e.g., a moving picture), the audio (e.g., a sound or a music), and the additional information (e.g., EPG) received from outside the broadcast receiving apparatus 100 through control by the control unit 110.

The input/output unit 160 may include a high-definition multimedia interface (HDMI) output port 161, a USB input port 162, a component output jack 163, a composite output port 164, a cable output port 165, a headphone output jack 168, and/or an S/PDIF output port 167.

It will be readily understood by those skilled in the art that a configuration and an operation of the input/output unit 160 may be implemented in various ways according to an example embodiment.

The storage unit 170 may store various types of data, programs, or applications for driving and controlling the broadcast receiving apparatus 100 by control of the control unit 110. The storage unit 170 may store signals or data that is input or output corresponding to driving of the tuner unit 120, the communication unit 130, the light receiving unit 140, the display unit 150, the built-in speaker 155, the input/output unit 160 and the power unit 180. The storage unit 170 may store control programs for controlling the broadcast receiving apparatus 100 and the control unit 110, an application initially provided by a manufacturer or downloaded from the outside, a graphic user interface (GUI) associated with the application, an object (e.g., an image, text, icon, or button) for providing the GUI, user information, documents, databases, or relevant data.

In an example embodiment, the term "storage unit" includes the storage unit 170, the ROM 112 or the RAM 113 of the control unit 110, or a memory card (e.g., a micro SD card, a USB memory, or not shown) mounted on the broadcast receiving apparatus 100. The storage unit may include a nonvolatile memory, a volatile memory, a hard disk drive (HDD) and a solid state drive (SSD).

Although not shown, the storage unit 170 may include a broadcast receiving module, a channel control module, a volume control module, a communication control module, a voice recognition module, a motion recognition module, a light receiving module, a display control module, an audio control module, an input/output control module, a power control module, a voice database (DB), or a motion DB. The modules and the DBs of the storage unit not shown may be implemented as software for the broadcast receiving apparatus 100 to perform functions of broadcast reception control, channel control, volume control, communication control, voice recognition, motion recognition, light reception control, display control, audio control, external input control, or power control. The control unit 110 may perform each function using the software stored in the storage unit.

The storage unit 170 may store the broadcast signal received through the tuner unit 120. In addition, the storage unit 170 may store the decoded audio, video, and/or additional information through control by the control unit 110.

The storage unit 170 may store consumer electronics control (CEC), which is a control protocol using an HDMI. The storage unit may store status information (e.g., power-on or power-off) corresponding to power on/off of the display apparatus 190, which is detected through the CEC.

The storage unit 170 may store content (e.g., an image file, a music file, or an image file) received through the communication unit 130.

The storage unit 170 may store control signals received from the remote controller 50 through the light receiving unit 140.

The storage unit 170 may store an image, a symbol, and/or a text that can be displayed on the display unit 150.

The storage unit 170 may store a source (e.g., a separate image, or an animation effect such as fadedness that is applied to the separate image) corresponding to a visual feedback and/or a source (e.g., a sound or an acoustic source) corresponding to an acoustic feedback.

The power unit 180 supplies power from an external power source to the internal components 110 to 180 of the broadcast receiving apparatus 100 through control by the control unit 110. At least one component may be added to or deleted from the components (e.g., 110 to 180) of the broadcast receiving apparatus 100 shown in FIGS. 1 and 2 on the basis of the performance of the broadcast receiving apparatus 100. It will be readily understood by those skilled in the art that positions of the components (e.g., 110 to 180) may be changed depending on the performance or structure of the broadcast receiving apparatus 100.

Referring to FIGS. 2, 5A-5C, and 10, the remote controller 50 that controls the broadcast receiving apparatus 100 includes a control unit (not shown), an input unit (not shown), a communication unit (not shown), a light output unit (not shown), a storage unit (not shown), and a power unit (not shown). Alternatively, the remote controller 50 may include a control unit (not shown), an input unit (not shown), a light output unit (not shown), a storage unit (not shown), and a power unit (not shown) except for the communication unit.

The remote controller 50 may be used as a term for an electronic device that can control the broadcast receiving apparatus 100. The remote controller 50 may include an electronic device that may install a controllable application (not shown) of the broadcast receiving apparatus 100. An electronic device having a display (e.g., a touch panel or a display panel) that can download and install the controllable application (not shown) of the broadcast receiving apparatus 100 may include a cell phone (not shown), a smart phone (not shown), a tablet PC (not shown), or a note PC (not shown).

A user may control the broadcast receiving apparatus 100 using a function key (e.g., a volume key; not shown) included in a graphic user interface (GUI; not shown) provided by an application installed in the remote controller 50.

A control unit (not shown) of the remote controller 50 may include a processor (not shown), a read only memory (ROM; not shown) that stores a control program for controlling the remote controller 50, and a random access memory (RAM; not shown) that stores a signal or data received from outside the remote controller 50 or is used as storage areas for various tasks performed by the remote controller 50.

A control unit (not shown) of the remote controller 50 functions to control an overall operation of the remote controller 50 and a signal flow between internal components (not shown) and process data. The control unit (not shown) controls power supply to the internal components (not shown) using a power unit (not shown). Further, the processor (not shown), the ROM (not shown), and the RAM (not shown) may be connected to each other via an internal bus.

In an example embodiment, the term "control unit of the remote controller" includes the processor (not shown), the ROM (not shown), and the RAM (not shown).

The input unit (not shown) of the remote controller 50 may include keys 51 to 57 or a touch pad (not shown) that receives a user input (e.g., a touch or press) for controlling the broadcast receiving apparatus 100.

For example, the remote controller 50 may include a power key 51, a number key 52, a navigation key 53, an enter key 54, an exit key 55, a menu key 56, a volume key 57, and a channel key 58. The remote controller 50 may include a speaker key 59a for selecting an audio output mode of a decoded audio in the broadcast receiving apparatus 100. An audio output mode that is selectable by the speaker key 59a may include an output 191a of audio from only the built-in speaker 155 of the broadcast receiving apparatus 100, an output 191b of audio from both of the built-in speaker 155 of the broadcast receiving apparatus 100 and a built-in speaker (not shown) of the display apparatus 190, and an output 191c of video, audio, and/or additional information from the built-in speaker 155 of the broadcast receiving apparatus 100 and the display apparatus 190.

The remote controller 50 may include an audio effect key 59b for selecting an equalizing mode (e.g., an audio effect) of the decoded audio. An audio effect that is selectable by the audio effect key 59b may include a movie mode, a music mode, a news mode, a sport mode, a normal mode, or a night mode.

The remote controller 50 may include a BT/RT key 59c for connecting the broadcast receiving apparatus 100 with the outside in a wireless manner. A wireless network that is selectable by the BT/RT key 59c may include a wireless network supported by the broadcast receiving apparatus 100. For example, when the broadcast receiving apparatus 100 supports three wireless communication schemes (e.g., Bluetooth, near field communication (NFC), and wireless fidelity (Wi-Fi), which may vary depending on the broadcast receiving apparatus), one wireless communication scheme may be selected from among the three wireless communication schemes through the BT/RF key 59c of the remote controller 50. When the broadcast receiving apparatus 100 supports Bluetooth, a user may press the BT/RF key 59c to connect the broadcast receiving apparatus 100 with an external device over Bluetooth.

The remote controller 50 may include a music key 59d for directly selecting an audio channel that can be received by the broadcast receiving apparatus 100. An audio channel (e.g., channel no. 632: K-POP broadcast) corresponding to the music key 59d may be set using a configuration setup 192 included in a menu. The audio channel corresponding to the music key 59d may be set using a channel number or a channel name. For example, the audio channel corresponding to the music key 59d may be set as channel no. 632. Alternatively, the audio channel corresponding to the music key 59d may be set as K-POP.

A plurality of audio channels may be set for the music key 59d. For example, the plurality of audio channels (e.g., channel no. 632: K-POP broadcast, channel no. 633: classical music broadcast, and channel no. 634: film music broadcast) are set for the music key 59d, the audio channel may be selected in the order of channel number according to selection of the music key 59d. When one audio channel (e.g., channel no. 632: K-POP broadcast) is selected as a favorite audio channel from among the plurality of audio channels, the favorite audio channel (e.g., channel no. 632: K-POP broadcast) may be selected preferentially over other audio channels.

The input unit (not shown) may include a microphone (not shown) that receives a voice uttered by a user or a sensor (not shown, e.g., a motion sensor, a gyro sensor, an acceleration sensor, a gravitation sensor, etc.) that detects a motion of the remote controller 50. An input unit (not shown) of the remote controller 50 may output a signal (e.g., an analog signal or a digital signal) corresponding to a received user input (e.g., a touch, press, touch gesture, voice, or motion) to a control unit (not shown).

A communication unit (not shown) of the remote controller 50 may transmit a control signal corresponding to the user input to the display apparatus 190 through control by the control unit (not shown). The communication unit (not shown) may include at least one of a wireless LAN unit (not shown) and a short-range communication unit (not shown). For example, the communication unit may include one or both of the wireless LAN unit (not shown) and the short-range communication unit (not shown).

When an access point (AP) is installed, the wireless LAN unit (not shown) may be wirelessly connected to the AP through control by the control unit (not shown). The wireless LAN unit 131 supports a wireless LAN specification (IEEE802.11x) of the Institute of Electrical and Electronics Engineers (IEEE). In addition, the short-range communication unit (not shown) may perform wireless short-range communication between a portable device 100 and an external device, with no AP, through control by the control unit (not shown). The short-range communication may include Bluetooth, Bluetooth Low Energy, infrared data association (IrDA), wireless fidelity (Wi-Fi), ultra-wideband (UWB), and near field communication (NFC).

A light output unit (not shown) of the remote controller 50 outputs an optical signal (e.g., including a control signal) corresponding to the received user input (e.g., a touch, press, touch gesture, or motion) to the light receiving unit 140 of the broadcast receiving apparatus 100 through control by the control unit (not shown). A remote controller code format used by the remote controller 50 may use one of a dedicated remote controller code format of a manufacturer and a commercial remote controller code format. The remote controller code format may include a leader code and a data word. The output optical signal may be modulated onto a carrier wave and then output. The control signal may be stored by a storage unit (not shown) or generated by the control unit (not shown). The remote controller 50 may include an infrared-laser emitting diode (IR-LED).

The remote controller 50 may include at least one of a communication unit (not shown) and a light output unit (not shown). For example, the remote controller 50 may include one or both of the communication unit (not shown) and the light output unit (not shown). The control unit (not shown) may selectively output a control signal corresponding to a user input to the broadcast receiving apparatus 100 through one of the communication unit (not shown) and the light output unit (not shown).

The storage unit (not shown) of the remote controller 50 may store various types of data, programs, or applications for driving and controlling the remote controller 50 through control by the control unit (not shown). The storage unit (not shown) may store inputs corresponding to the driving of the communication unit (not shown), the light output unit (not shown), and the power unit (not shown), or signals or data to be output. The storage unit (not shown) may store a control signal corresponding to the received user input (e.g., a touch, press, touch gesture, voice, or motion) through control by the control unit (not shown).

The power unit (not shown) of the remote controller 50 may supply power to components (not shown) inside the remote controller 50 through control by the control unit (not shown). The power unit (not shown) may supply power from one or more batteries (not shown) positioned inside the remote controller 50 to the internal components (not shown).

Figure 9:
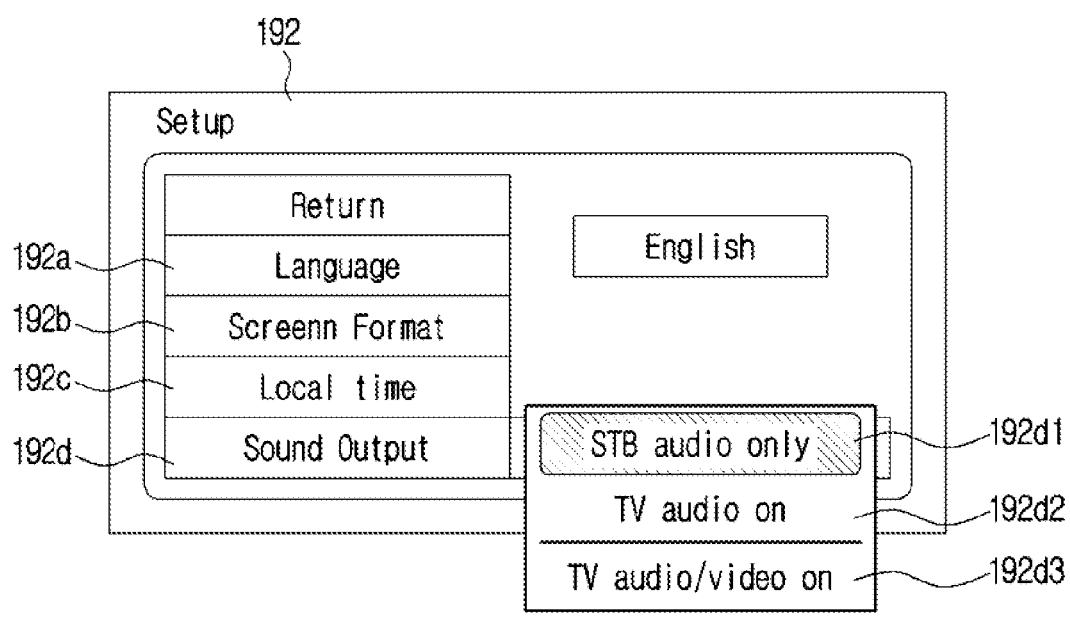
FIG. 9 is an enlarged view illustrating an example of setting an audio output mode of a broadcast receiving apparatus according to an example embodiment.

The remote controller 50 may include a remote controller that includes the number key 52 and the navigation key 53 as shown in FIGS. 1, 4, and 5 and a remote controller that does not include the number key 52 and the navigation key 53 as shown in FIG. 9. In addition, the remote controller 50 may include a remote controller (not shown) having one of the number key 52 and the navigation key 53.

At least one component may be added to or deleted from the components of the remote controllers 50 shown in FIGS. 1, 2, 5, and 9 on the basis of the performance of the remote controller 50. It will be readily understood by those skilled in the art that positions of the components may be changed depending on the performance or structure of the remote controller 50.

The display apparatus 190 may output the decoded audio, video, and/or additional information that are/is received from the broadcast receiving apparatus 100. The display apparatus 190 may selectively output at least one of the decoded audio, video, and/or additional information in response to power-on. For example, when the display apparatus 190 is powered off, the display apparatus 190 may not output the decoded audio, video, and/or additional information. When the display apparatus 190 is powered on, the display apparatus 190 may selectively output at least one of the decoded audio, video, and/or additional information, which are received from the broadcast receiving apparatus 100.

The display apparatus 190 may include a liquid crystal display (LCD), an organic light-emitting diode (OLED), a plasma display panel (PDP), or a quantum dot (QD). In addition, an output resolution of the display apparatus 190 may include, for example, a high definition (HD), full HD, ultra HD, or a higher output resolution.

The display apparatus 190 may include a plurality of built-in speakers. The display apparatus 190 may support a 2-channel, 2.1-channel, 4.1-channel, 5.1-channel, or 7.1-channel speaker.

The additional speaker 195 may output the decoded audio that is received from the broadcast receiving apparatus 100. The control unit 110 of the broadcast receiving apparatus 100 may selectively output the decoded audio to the built-in speaker 155 and the additional speaker 195. For example, the control unit 110 of the broadcast receiving apparatus 100 may output the decoded audio to only the built-in speaker 155. Alternatively, the control unit 110 of the broadcast receiving apparatus 100 may output the decoded audio to both of the built-in speaker 155 and the additional speaker 195.

The additional speaker 195 may be connected to one of the broadcast receiving apparatus 100 and the display apparatus 190. Alternatively, the additional speaker 195 may be connected to both of the broadcast receiving apparatus 100 and the display apparatus 190 (e.g., a separate set of speakers 195 may be connected).

The control unit 110 of the broadcast receiving apparatus 100 may output the decoded audio to the built-in speaker 155, the built-in speaker (not shown) of the display apparatus 190, and the additional speaker 195. Alternatively, the control unit 110 of the broadcast receiving apparatus 100 may output the decoded audio to the built-in speaker 155, the built-in speaker (not shown) of the display apparatus 190, an additional speaker (not shown) connected to the display apparatus 190, and the additional speaker 195.

The term "audio output unit" may include a built-in speaker of a broadcast receiving apparatus, an additional speaker connected to the broadcast receiving apparatus, a built-in speaker of a display apparatus, and/or an additional speaker connected to the display apparatus.

FIG. 3 is a schematic flowchart illustrating an audio output method of a broadcast receiving apparatus according to an example embodiment.

FIGS. 4A to 4D are views illustrating an example of an audio output method of a broadcast receiving apparatus according to an example embodiment.

In step S301 of FIG. 3, power is supplied to a broadcast receiving apparatus connected to a display apparatus.

Figure 4A:
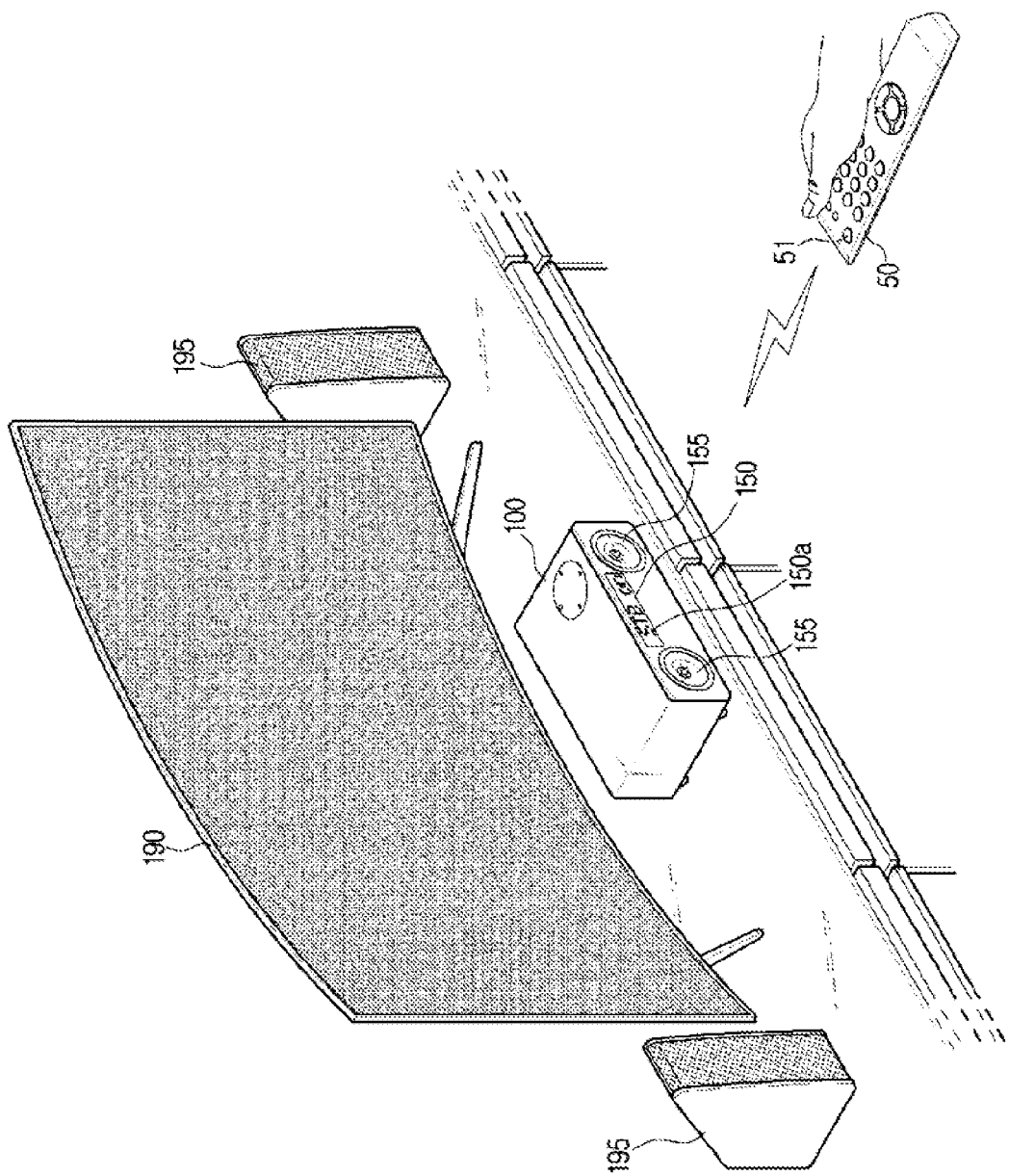
FIGS. 4A to 4D are views illustrating an example of an audio output method of a broadcast receiving apparatus according to an example embodiment.

Referring to FIG. 4A, power is supplied to the broadcast receiving apparatus 100 by the remote controller 50. When the power key 51 of the remote controller 50 is selected by a user, the control unit (not shown) of the remote controller 50 may use a communication unit (not shown) or light output unit (not shown) to output a first control signal (e.g., corresponding to power-on of the broadcast receiving apparatus 100) to the broadcast receiving apparatus 100.

In an example embodiment, the term "key selection" may be used to indicate a press of a key or a touch or contact of a key. A set time may be, for example, 500 ms (which can be changed through the setting).

The control unit 110 of the broadcast receiving apparatus 100 may power on the broadcast receiving apparatus 100 in response to a first control signal received through the communication unit 130 or light receiving unit 140. In addition, the control unit 110 may allow the display of a text, icon, or symbol corresponding to power-on of the broadcast receiving apparatus 100 on the display unit 150.

The display unit 150 may display "Audio STB on" (150*a*) corresponding to the received first control signal through control by the control unit 110. The displayed "Audio STB on" (150*a*) may be moved to the left or right through control by the control unit 110. Alternatively, the displayed "Audio STB on" (150*a*) may flicker while being moved to the left or right through control by the control unit 110.

The control unit 110 may supply power to a luminous component (e.g., a light emitting device (LED); not shown) separately from the display unit 150 in response to power-on of the broadcast receiving apparatus 100. The luminous component (not shown) may emit a green color through control by the control unit 110. The luminous component (not shown) may emit various colors through control by the control unit 110. The luminous component (not shown) may emit various colors (e.g., blue, green, red, yellow, etc.) in response to status information (e.g., power-on, stand-by, booting, etc.) of the broadcast receiving apparatus 100.

The display apparatus 190 connected to the broadcast receiving apparatus 100 (e.g., over an HDMI) is in a power off state. The broadcast receiving apparatus 100 and the display apparatus 190 may be an apparatus that supports a consumer electronics control (CEC) function. Alternatively, the broadcast receiving apparatus 100 and the display apparatus 190 may not support the CEC function. The display apparatus 190 may be powered on or off using a separate remote controller (not shown) or a power key (including a power button).

In step S302 of FIG. 3, an audio channel is selected on the broadcast receiving apparatus by a user.

Figure 4B:
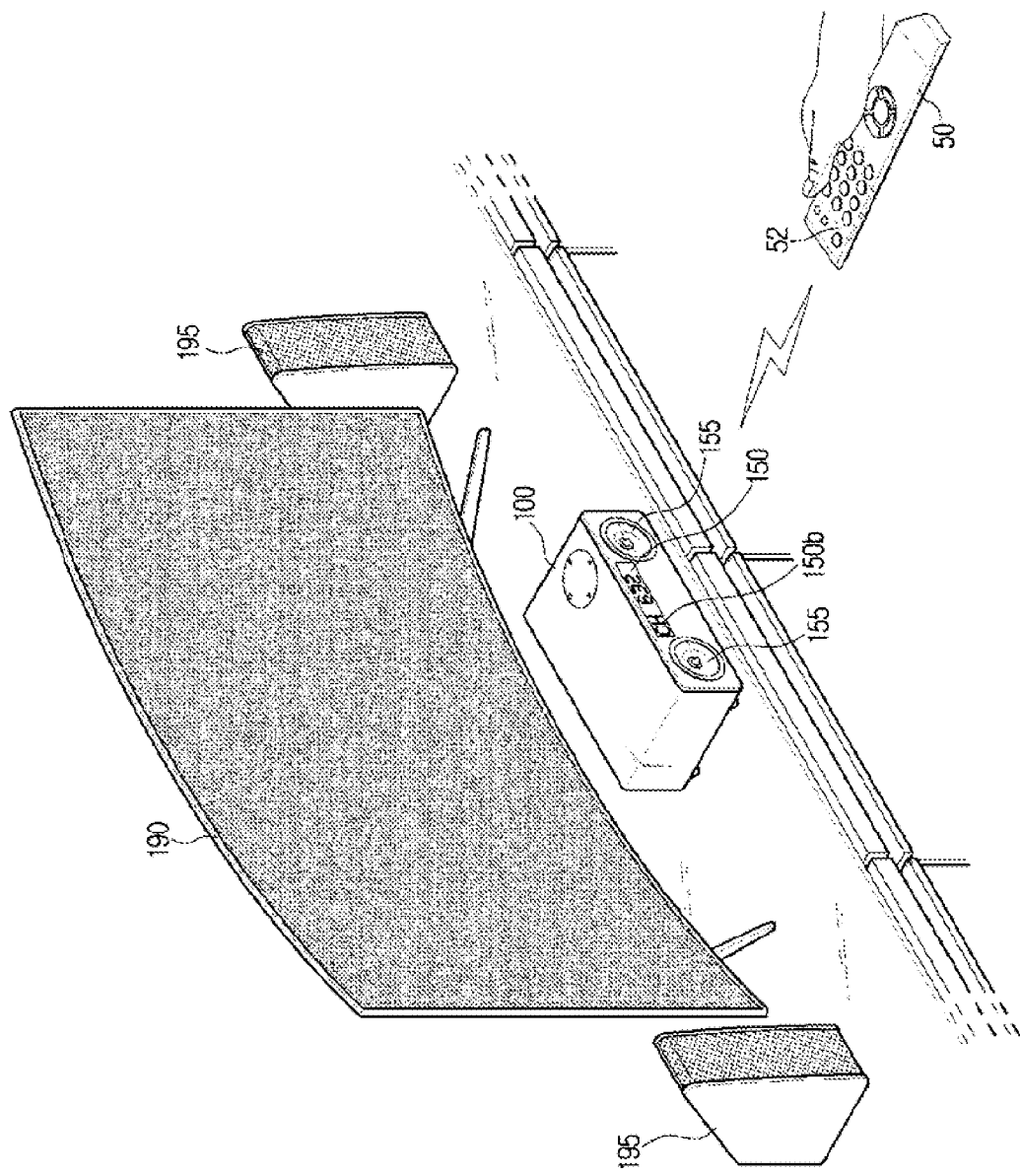
Figure 4C:
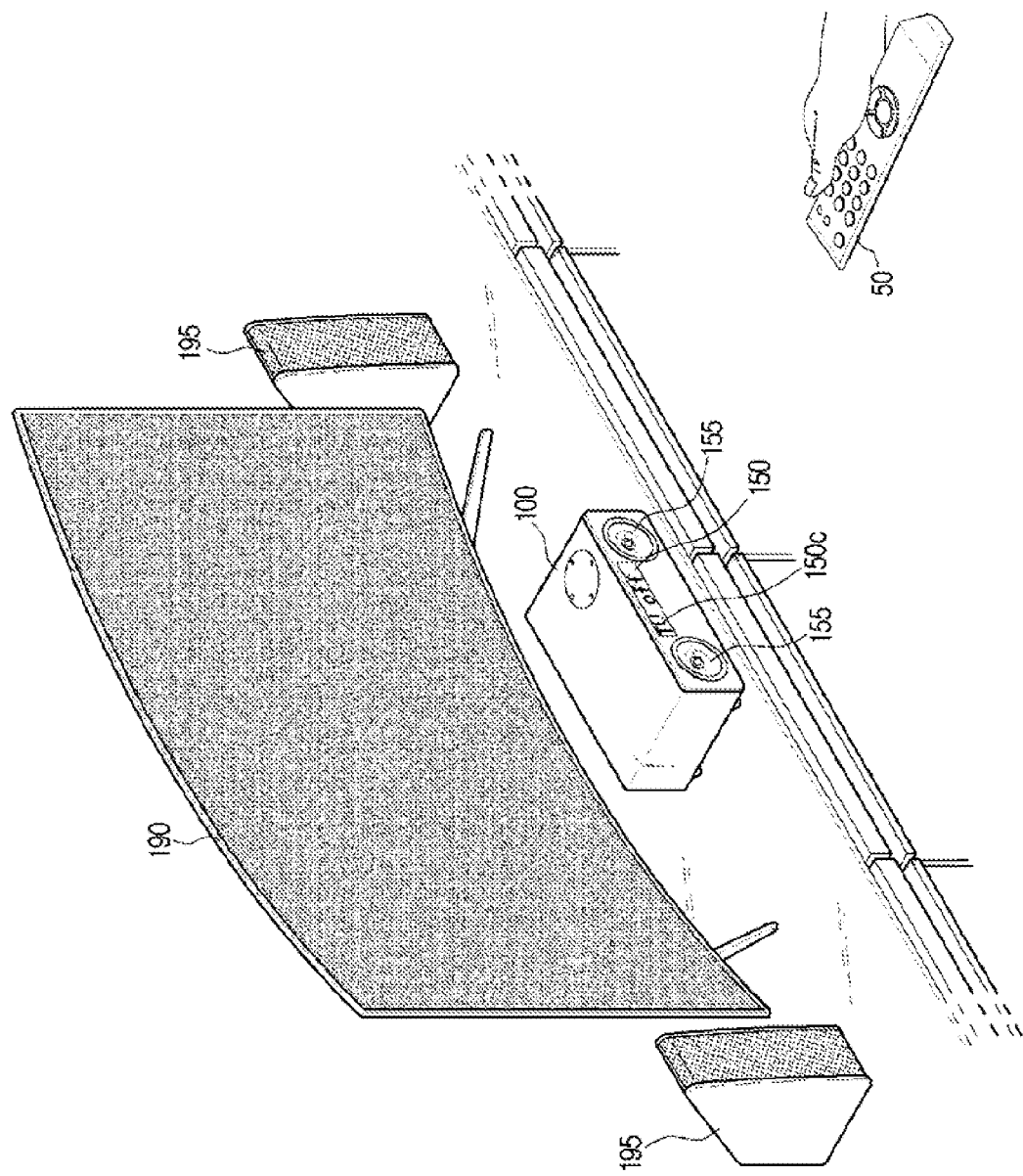

Referring to FIG. 4B, when the number key 52 corresponding to the audio channel is selected on the remote controller 50 by a user, a control unit (not shown) of the remote controller 50 outputs a channel number (including a second control signal) corresponding to the number key 52 to the broadcast receiving apparatus 100 through the light output unit (not shown). When the number key 52 corresponding to the audio channel is selected on the remote controller 50, a control unit (not shown) of the remote controller 50 may transmit a channel number (including a second control signal) corresponding to the number key 52 to the broadcast receiving apparatus 100 through the communication unit (not shown).

The broadcast receiving apparatus 100 receives the second control signal output from the remote controller 50, through the light receiving unit 140. Alternatively, the broadcast receiving apparatus 100 may receive the second control signal output from the remote controller 50, through the communication unit 130. The received second control signal may be stored in the storage unit through control by the control unit 110 of the broadcast receiving apparatus 100.

The display unit 150 may display "Ch 632 K-POP" (150*b*) corresponding to the received second control signal through control by the control unit 110. The displayed "Ch 632 K-POP" (150*b*) may be moved to the left or right through control by the control unit 110. Alternatively, the displayed "Ch 632 K-POP" (150*b*) may flicker while being moved to the left or right through control by the control unit 110.

The display apparatus 190 connected to the broadcast receiving apparatus 100 is in a power off state.

In step S303 of FIG. 3, audio/video data corresponding to a selected channel is received.

The control unit 110 of the broadcast receiving apparatus 100 may analyze the received second control signal and receive audio, video, and/or additional information corresponding to an audio channel through the tuner unit 120. The audio, video, and/or additional information corresponding to the received channel may be decoded through control by the control unit 110. The audio, video, and/or additional information corresponding to the received channel may be stored in the storage unit 170 through control by the control unit 110.

The control unit 110 may recognize a broadcast program using the decoded additional information (e.g., a channel number, a channel name, a song title, and a volume level). When the audio channel is selected, the control unit 110 may detect whether the display apparatus 190 connected to the broadcast receiving apparatus 100 is powered off.

The display unit 150 may display "Data receiving" (not shown) corresponding to reception of audio, video, and/or additional information corresponding to the received audio channel through control by the control unit 110.

The display apparatus 190 connected to the broadcast receiving apparatus 100 is in a power off state.

In step S304 of FIG. 3, a determination whether to power on the display apparatus is made. When the display apparatus 190 is to remain in a power off state, the method proceeds to step S305 of FIG. 3.

Referring to FIG. 3, the control unit 110 may detect status information (e.g., power on/off) of the connected display apparatus 190. The control unit 110 may recognize the power on/off of the display apparatus 190 by using the consumer electronics control (CEC) function. The CEC is a control protocol using one (e.g., pin 13, which may be a different pin) of a plurality of pins included in an HDMI. The user may use the remote controller 50 to control an apparatus (e.g., the broadcast receiving apparatus 100 and the display apparatus 190) connected through the HDMI using the CEC.

The CEC function may include, for example, one touch play, system standby, tuner preset transfer, one touch record, timer programming, system information, or tuner control in addition to the power on/off. It will be readily understood by those skilled in the art that the CEC function is not limited to the aforementioned functions as a version is updated. In addition, the CEC may be referred to by various names depending on a manufacturer of the apparatus.

When the control unit 110 determines whether to power on the display apparatus 190 connected to an HDMI port 161 of the input/output unit 160, the control unit 110 may allow the display of the power on/off of the display apparatus 190 on the display unit 150. For example, when the display apparatus 190 is powered off, the display unit 150 may display "TV off" (150*c*) through control by the control unit 110. Alternatively, when the display apparatus 190 is powered on, the display unit 150 may display "TV on" (150*e*; referring to FIG. 5A) through control by the control unit 110.

When the power on/off of the display apparatus 190 (e.g., the status information of the display apparatus 190) connected to the HDMI port 161 of the input/output unit 160 is detected, the control unit 110 may store the detected status information of the display apparatus 190 in a storage unit.

The control unit 110 may provide a visual feedback and/or an acoustic feedback in response to the power on/off of the display apparatus 190. The visual feedback may be provided through the display unit 150. In addition, the acoustic feedback may be provided through the built-in speaker 155 or the additional speaker 195.

Figure 7A:
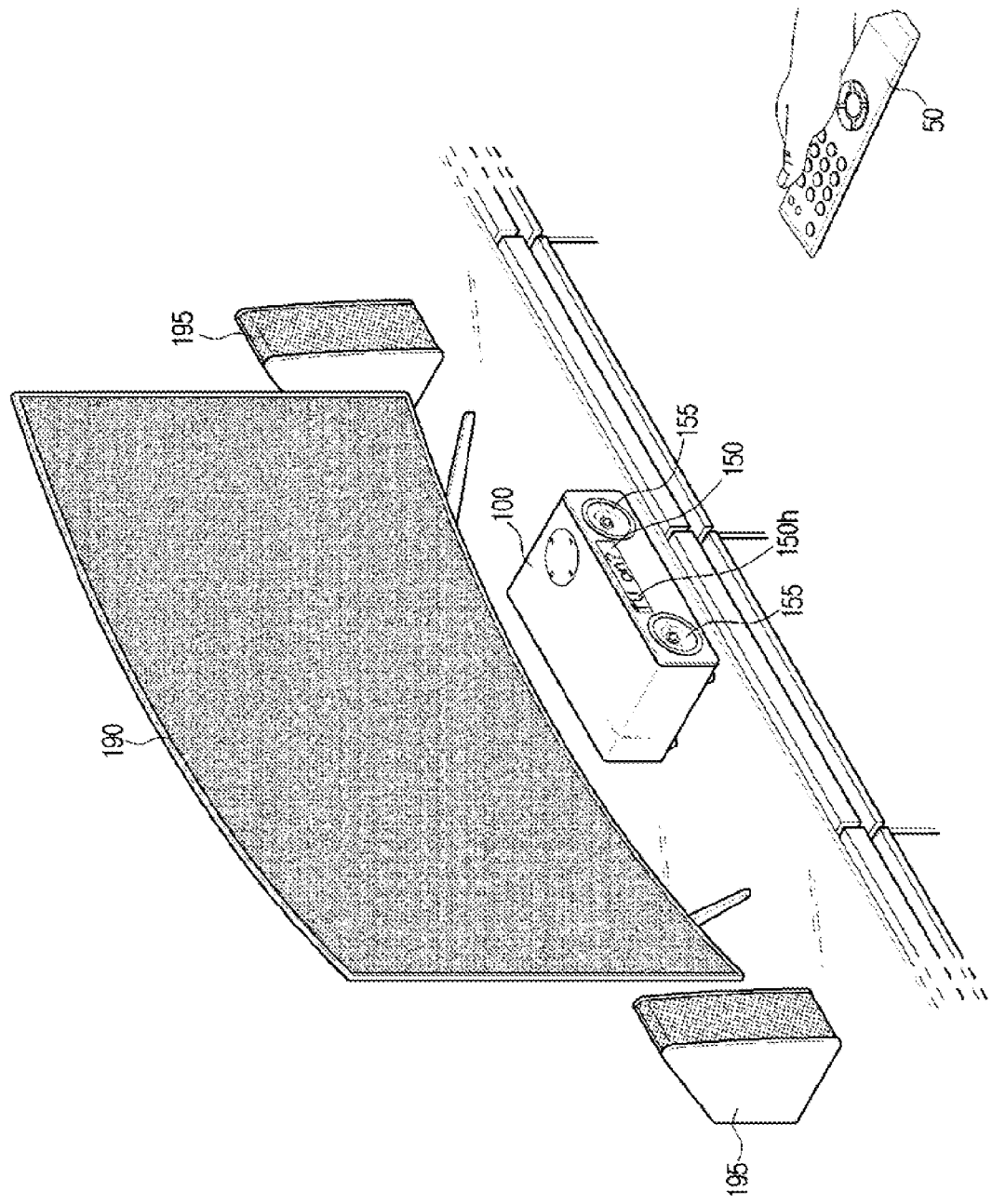
FIGS. 7A and 7B are views illustrating an example of an audio output method of a broadcast receiving apparatus according to another example embodiment.
Figure 7B:
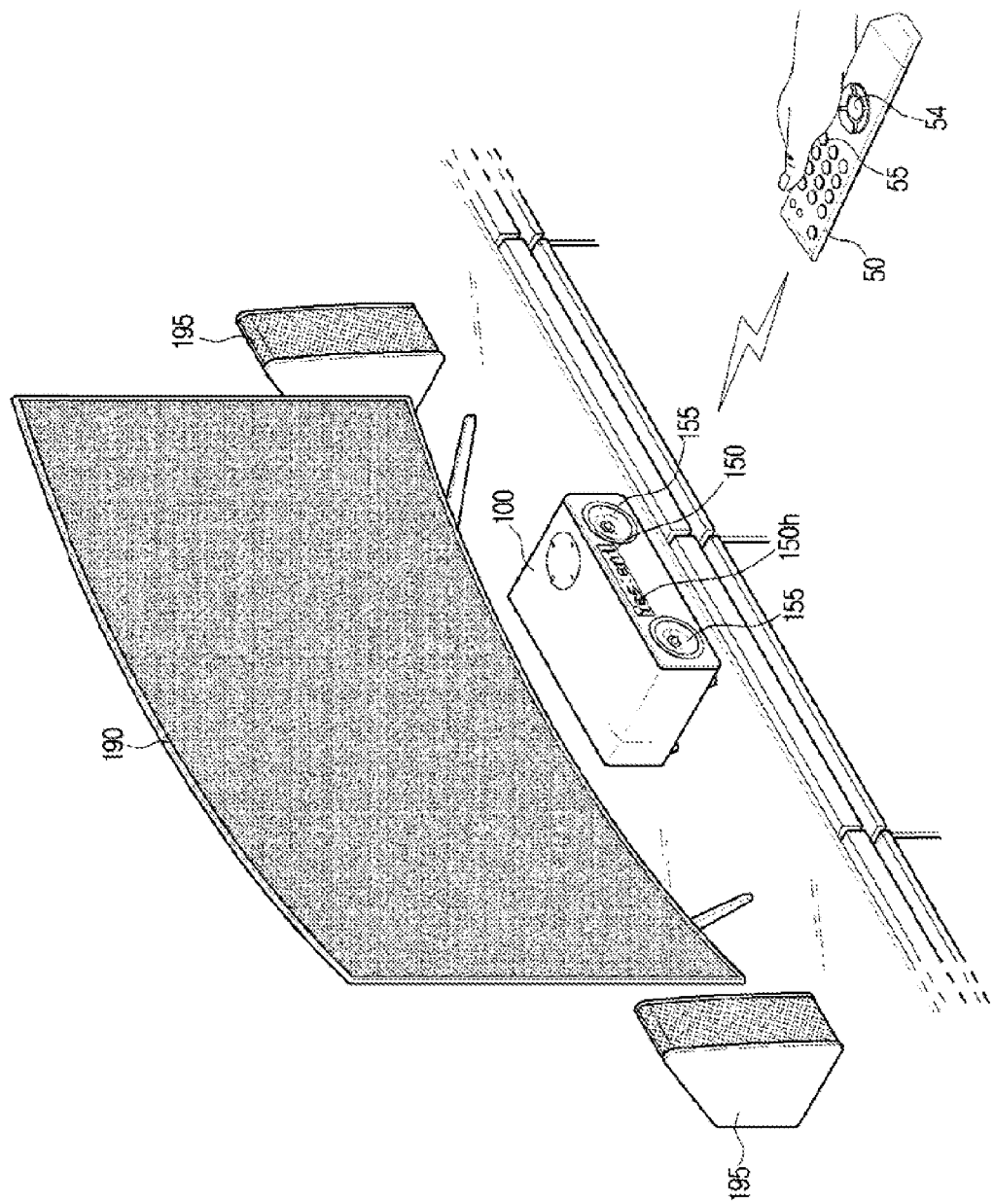

FIGS. 7A and 7B are views illustrating an example of an audio output method of a broadcast receiving apparatus according to another example embodiment.

Referring to FIGS. 7A and 7B, the display apparatus 190 is in a power off state. The control unit 110 may allow the display of a text, image, or symbol on the display unit 150 in response to the power-off state of the display apparatus 190. The control unit 110 may allow the display of "TV on? Yes: enter, No: exit" (150*h*) on the display unit 150. The displayed "TV on? Yes: enter, No: exit" (150*h*) may be moved to the left or right through control by the control unit 110. Alternatively, the displayed "TV on? Yes: enter, No: exit" (150*h*) may flicker while being moved to the left or right through control by the control unit 110.

A user may use an enter key 54 (e.g., power-on of the display apparatus 190) and/or an exit key 55 (e.g., power-off of the display apparatus 190) of the remote controller 50 to select one of power-on and power-off of the display apparatus 190.

A control unit (not shown) of the remote controller 50 may output a sixth control signal corresponding to a user selection to the broadcast receiving apparatus 100.

The storage unit 170 may store the received sixth control signal through control by the control unit 110.

In step S305 of FIG. 3, a speaker of the broadcast receiving apparatus outputs audio.

Figure 4D:
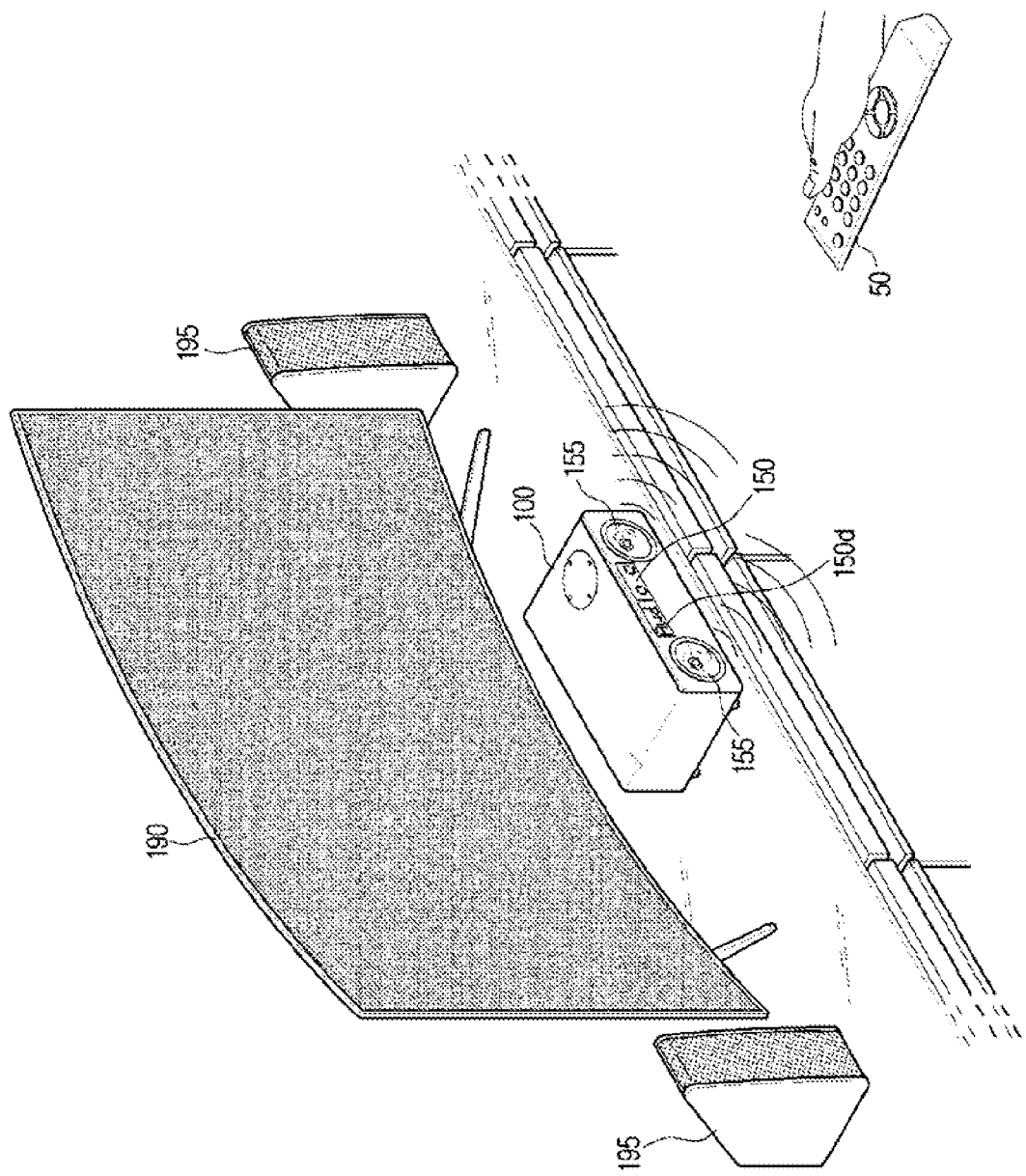

Referring to FIG. 4D, the control unit 110 outputs the decoded audio through the built-in speaker 155. The control unit 110 may output the decoded audio as an audio output mode corresponding to the detected status information (e.g., power-off) of the display apparatus 190. For example, the audio output mode of the broadcast receiving apparatus 100 may be an output mode in which only the broadcast receiving apparatus outputs audio ("STB audio only").

The control unit 110 may selectively output the decoded audio as an audio output mode corresponding to the detected status information (e.g., power-off) of the display apparatus 190. The control unit 110 may selectively output the decoded audio through the built-in speaker 155 and/or the built-in speaker (not shown) of the display apparatus 190 in response to the audio output mode. The control unit 110 may selectively output the decoded audio through the built-in speaker 155, the additional speaker 195, and/or the built-in speaker (not shown) of the display apparatus 190 in response to the audio output mode.

The output mode in which only the broadcast receiving apparatus outputs audio denotes an output mode in which audio is output only to the built-in speaker 155 of the broadcast receiving apparatus 100 without the built-in speaker (not shown) of the connected display apparatus 190. Alternatively, the output mode in which only the broadcast receiving apparatus outputs audio may denote an output mode in which audio is output to the built-in speaker 155 of the broadcast receiving apparatus 100 and the additional speaker 195 connected to the input/output unit 160 of the broadcast receiving apparatus 100 and not to the built-in speaker (not shown) of the connected display apparatus 190.

In addition, the display unit 150 may display "STB audio only" (150*d*) corresponding to the detected status information (e.g., power-off) of the display apparatus 190 through control by the control unit 110. The displayed "STB audio only" (150*d*) may be moved to the left or right through control by the control unit 110.

Alternatively, the displayed "STB audio only" (150*d*) may flicker while being moved to the left or right through control by the control unit 110.

The control unit 110 may provide a visual feedback and/or an acoustic feedback in response to the output mode in which only the broadcast receiving apparatus outputs audio. The visual feedback may be provided through the display unit 150. In addition, the acoustic feedback may be provided through the built-in speaker 155 or the additional speaker 195.

The display apparatus 190 connected to the broadcast receiving apparatus 100 is in a power off state.

In step S304 of FIG. 3, when the control unit 110 outputs audio to the built-in speaker 155 of the broadcast receiving apparatus 100, the audio output method of the broadcast receiving apparatus 100 is completed.

Returning to step S304 of FIG. 3, when the display apparatus 190 is powered on, the method proceeds to step S306.

Figure 5A:
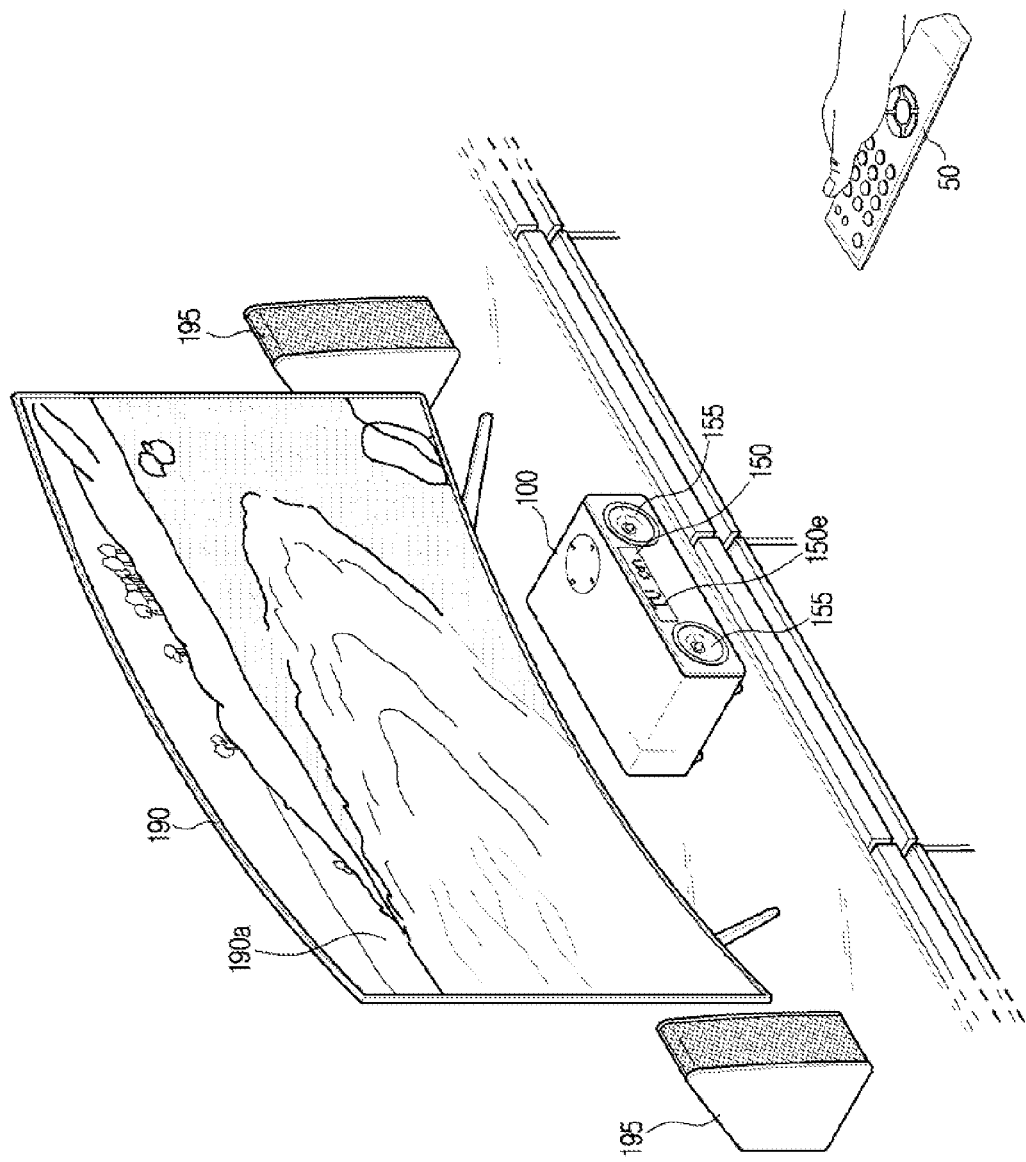
Figure 5C:
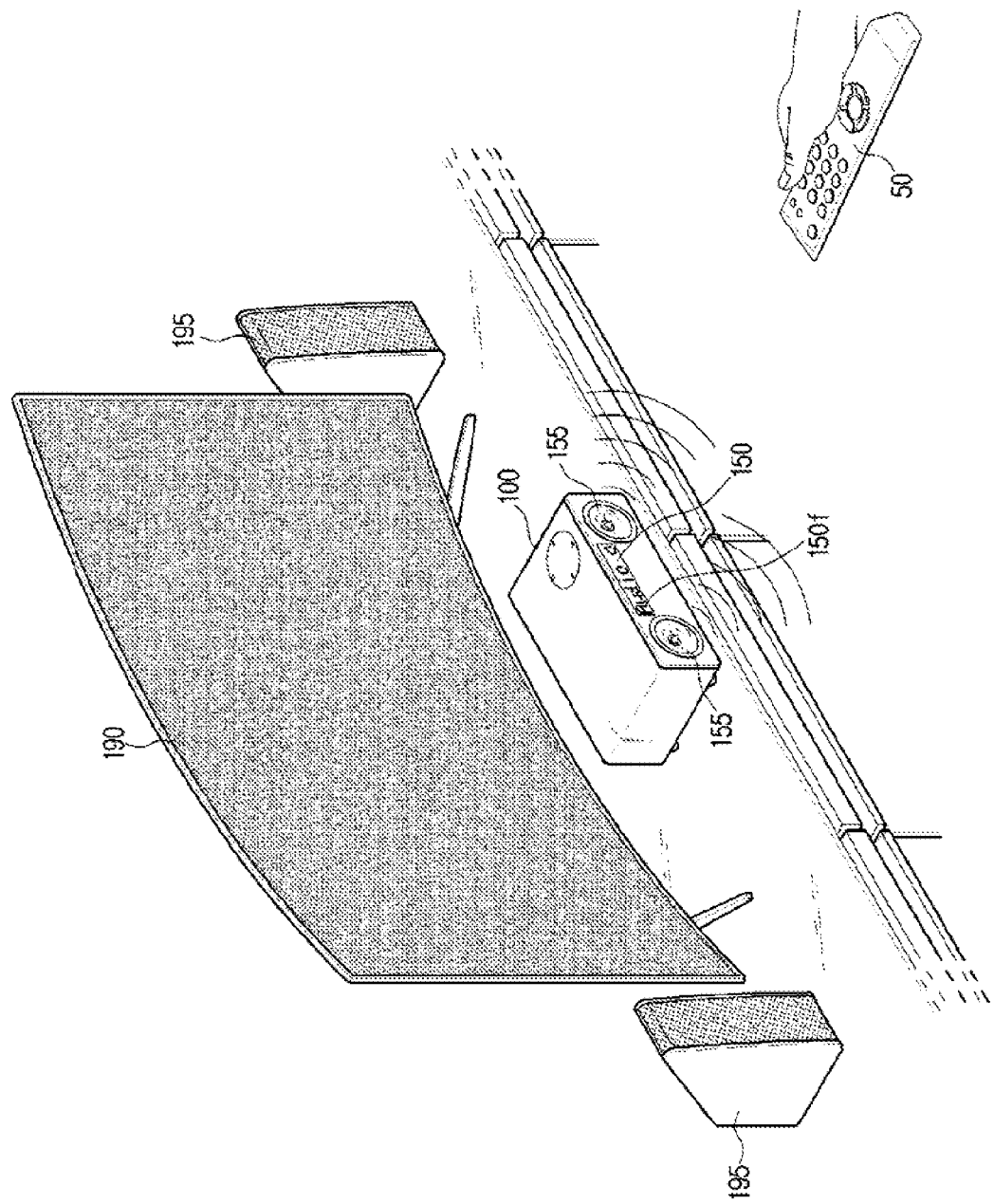

FIGS. 5A to 5C are views illustrating an example of an audio output method of a broadcast receiving apparatus according to another example embodiment.

In step S306 of FIG. 3, a determination whether to transmit audio, video, and/or additional information to the display apparatus is made.

Referring to FIG. 5A, the control unit 110 of the broadcast receiving apparatus 100 may recognize the power-on of the display apparatus 190 by using the consumer electronics control (CEC) function.

A video 190*a* displayed on a screen of the display apparatus 190 may be different from a decoded video of an audio channel (e.g., channel no. 632) selected by the broadcast receiving apparatus 100. For example, the video 190*a* displayed on the screen of the display apparatus 190 may be a moving picture corresponding to content stored in the storage unit. Alternatively, the video 190*a* displayed on the screen of the display apparatus 190 may be a video received by another tuner unit (not shown).

When the display apparatus 190 is powered on, the display unit 150 may display "TV on" (150*e*) through control by the control unit 110.

Referring to FIG. 5B, the control unit displays a pop-up on the display apparatus 190.

When the display apparatus 190 is powered on, the control unit 110 displays a pop-up 191 on a screen of the display apparatus 190 to select an audio output mode of the broadcast receiving apparatus 100.

Items of the pop-up 191 may include "STB audio only" (191*a*) in which only the broadcast receiving apparatus 100 outputs audio, "TV audio on" (191*b*) in which both of the broadcast receiving apparatus 100 and the built-in speaker (not shown) of the display apparatus 190 output audio, and "TV audio/video on" (191*c*) in which the broadcast receiving apparatus 100 outputs audio and the display apparatus 190 outputs audio, video, and/or additional information. It will be readily understood by those skilled in the art that the audio output modes 191*a* to 191*c* included in the pop-up 191 may be changed depending on the function or structure of the broadcast receiving apparatus 100 and/or the display apparatus 190.

A user uses the navigation key 53 and/or the enter key 54 of the remote controller 50 to select one (e.g., 191*a*) of the audio output modes. The control unit (not shown) of the remote controller 50 may output a third control signal corresponding to the selected audio output mode (e.g., the output mode in which only the broadcast receiving apparatus outputs audio) to the broadcast receiving apparatus 100.

The storage unit 170 may store the received third control signal through control by the control unit 110.

The control unit 110 may provide a visual feedback and/or an acoustic feedback in response to selection of the output mode 191*a* in which only the broadcast receiving apparatus outputs audio. The visual feedback may be provided through the display unit 150. In addition, the acoustic feedback may be provided through the built-in speaker 155 or the additional speaker 195.

In step S307 of FIG. 3, the speaker of the broadcast receiving apparatus outputs audio, and the display apparatus does not output audio, video, and/or additional information.

Referring to FIG. 5C, the control unit 110 outputs the decoded audio through the built-in speaker 155 in response to the determined output mode in which only the broadcast receiving apparatus outputs audio. The control unit 110 may output the decoded audio through the built-in speaker 155 and/or the additional speaker 195 in response to the output mode in which only the broadcast receiving apparatus outputs audio.

In addition, the control unit 110 uses the CEC function to power off the display apparatus 190 that displays a video 190*a*. The control unit 110 does not output audio, video, and/or additional information to the display apparatus 190 (that is powered off). Alternatively, even when the control unit 110 outputs audio, video, and/or additional information to the display apparatus 190, the control unit 110 cannot output the audio, video, and/or additional information to the display apparatus 190 that is powered off.

An audio output method of the broadcast receiving apparatus 100 in step S307 of FIG. 3 is substantially similar to that in step S305 of FIG. 3, and repetitive description thereof will be omitted.

In step S307 of FIG. 3, when the control unit 110 outputs audio to the built-in speaker 155 of the broadcast receiving apparatus 100, the audio output method of the broadcast receiving apparatus 100 is completed.

Returning to step S306 of FIG. 3, when the display apparatus 190 outputs audio, video, and/or additional information, the method proceeds to step S308.

Figure 6A:
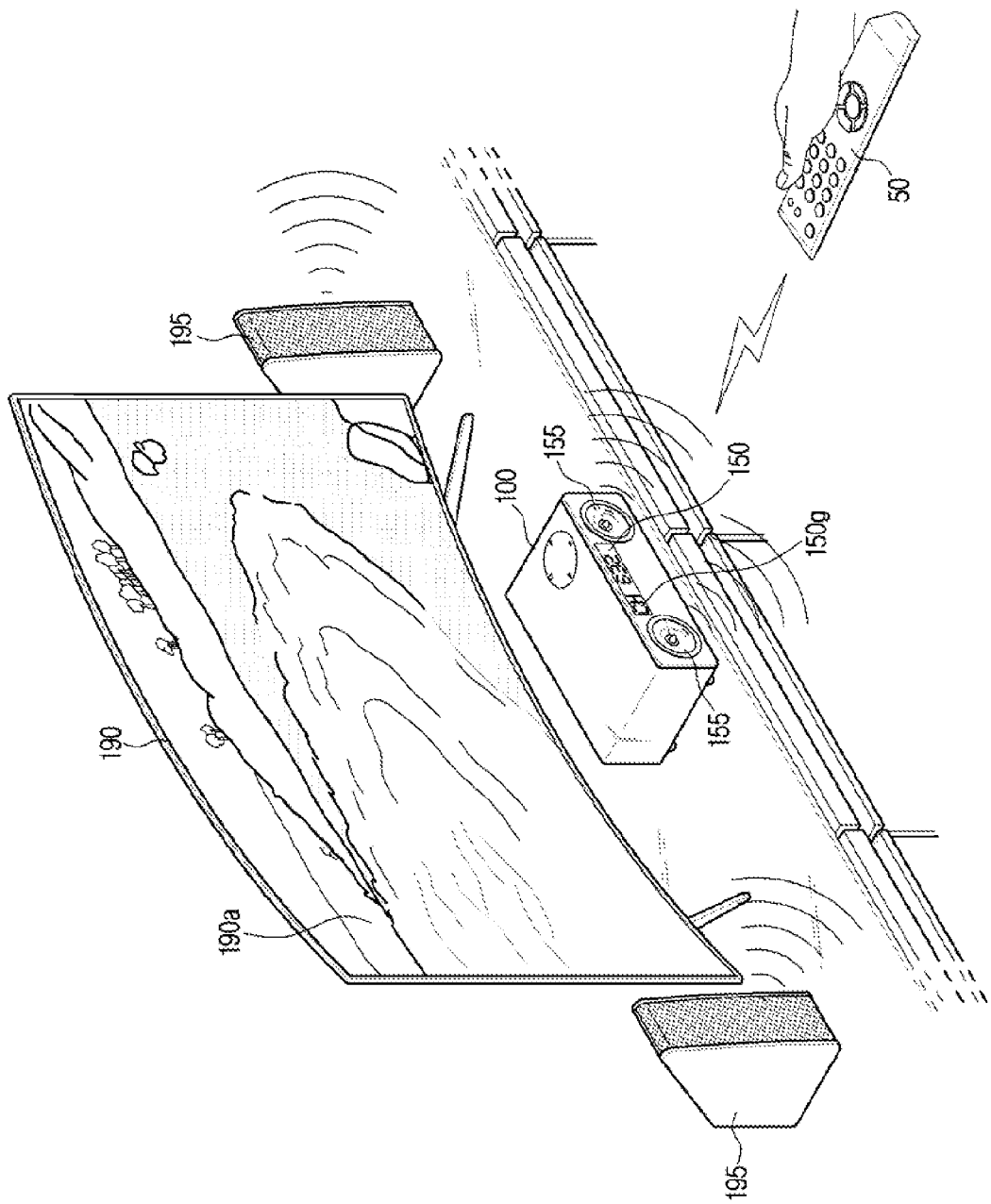
FIGS. 6A to 6C are views illustrating an example of an audio output method of a broadcast receiving apparatus according to another example embodiment.
Figure 6B:
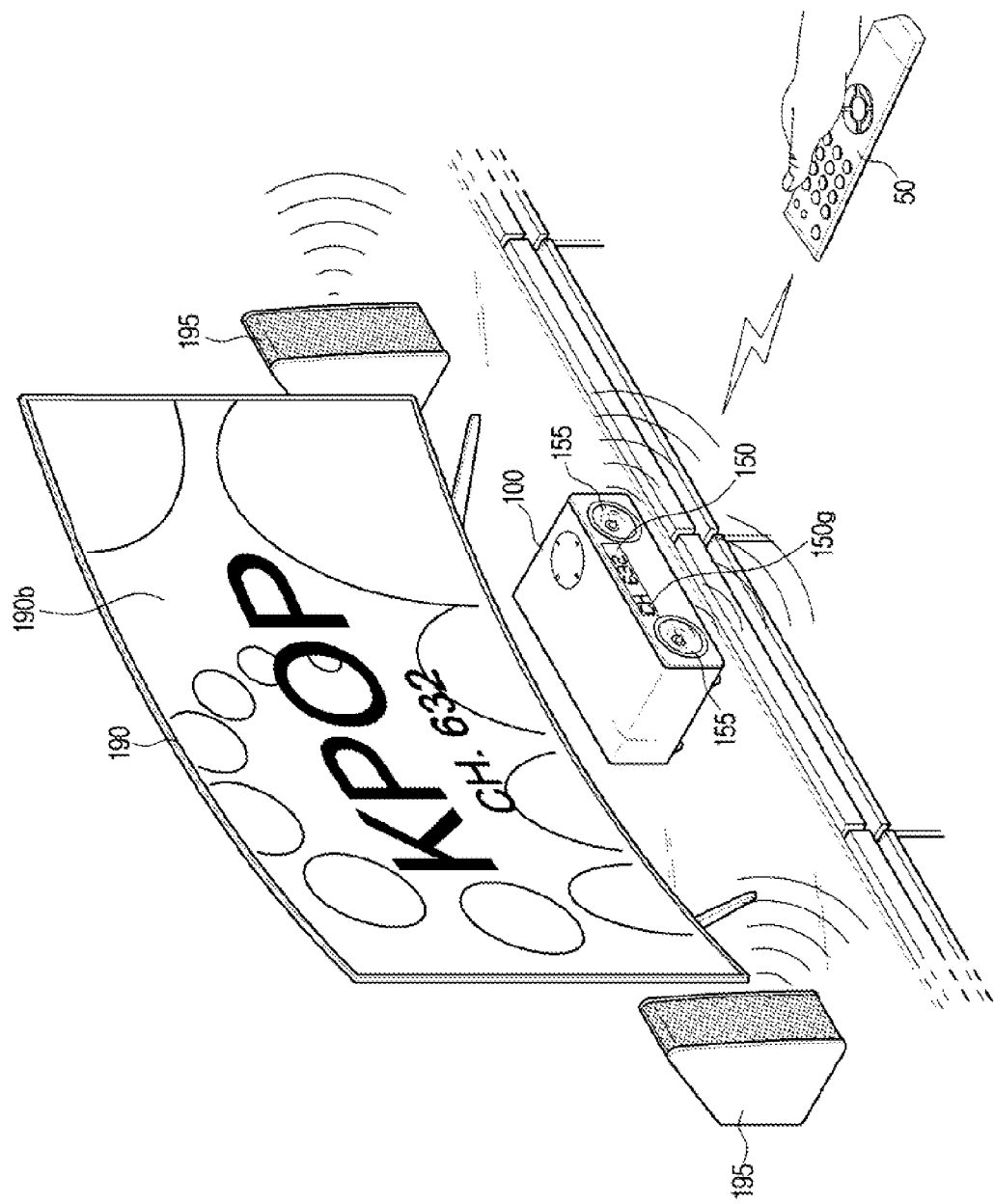

FIGS. 6A and 6B are views illustrating an example of an audio output method of a broadcast receiving apparatus according to another example embodiment.

In step S308 of FIG. 3, the speaker of the broadcast receiving apparatus outputs audio, and the display apparatus outputs audio, video, and/or additional information.

Referring to FIGS. 5B, 6A, and 6B, the control unit 110 may output decoded audio through the built-in speaker 155 and output decoded audio, video, and/or additional information to the display apparatus 190.

In FIGS. 5B and 6A, a user uses the navigation key 53 and/or the enter key 54 of the remote controller 50 to select one (e.g., 191*b*) of the audio output modes. The control unit (not shown) of the remote controller 50 may output a fourth control signal corresponding to the selected audio output mode (e.g., an output mode in which both of the broadcast receiving apparatus 100 and the display apparatus 190 output audio) to the broadcast receiving apparatus 100.

The storage unit 170 may store the received fourth control signal through control by the control unit 110.

The display unit 150 may display "Ch 632 K-POP" (150*g*), which is a channel number (or a channel number and a channel name) included in the decoded additional information, corresponding to the received fourth control signal through control by the control unit 110. The displayed "Ch 632 K-POP" (150*g*) may be moved to the left or right through control by the control unit 110. Alternatively, the displayed "Ch 632 K-POP" (150*g*) may flicker while being moved to the left or right through control by the control unit 110.

The control unit 110 may allow the "Ch 632 K-POP" (150*g*), which is a channel number (or a channel number and a channel name) included in the decoded additional information, to be output to and displayed on the display apparatus 190. The control unit 110 may selectively output the decoded additional information to be displayed to the display unit 150 and the display apparatus 190. For example, the control unit 110 may allow the decoded additional information to be output to and displayed on one or both of the display unit 150 and the display apparatus 190.

The control unit 110 may provide a visual feedback and/or an acoustic feedback in response to selection of the output mode 191*b* in which both of the broadcast receiving apparatus 100 and the display apparatus 190 output audio. The visual feedback may be provided through the display unit 150. In addition, the acoustic feedback may be provided through the built-in speaker 155 or the additional speaker 195.

The control unit 110 may output the decoded audio through the built-in speaker 155 of the broadcast receiving apparatus 100 and the built-in speaker (not shown) of the display apparatus 190 in response to the output mode 191*b* in which both of the broadcast receiving apparatus 100 and the display apparatus 190 output audio. The control unit 110 may output the decoded audio through the built-in speaker 155, the additional speaker 195, and the built-in speaker (not shown) of the display apparatus 190 in response to the output mode 191*b* in which both of the broadcast receiving apparatus 100 and the display apparatus 190 output audio.

In addition, the control unit 110 does not use the CEC function to power off the display apparatus 190 in response to the selected audio output mode 191*b*. The display apparatus 190 may keep displaying the video 190*a*.

In FIGS. 5B and 6B, a user uses the navigation key 53 and/or the enter key 54 of the remote controller 50 to select one (e.g., 191*c*) of the audio output modes. The control unit (not shown) of the remote controller 50 may output a fifth control signal corresponding to the selected audio output mode (e.g., an output mode in which the broadcast receiving apparatus 100 outputs audio and the display apparatus 190 outputs audio, video, and/or additional information) to the broadcast receiving apparatus 100.

The storage unit 170 may store the received fifth control signal through control by the control unit 110.

The display unit 150 may display "Ch 632 K-POP" (150*g*), which is a channel number (or a channel number and a channel name) included in the decoded additional information, corresponding to the received fifth control signal through control by the control unit 110. The displayed "Ch 632 K-POP" (150*g*) may be moved to the left or right through control by the control unit 110. Alternatively, the displayed "Ch 632 K-POP" (150*g*) may flicker while being moved to the left or right through control by the control unit 110.

The control unit 110 may allow the "Ch 632 K-POP" (150*g*), which is a channel number (or a channel number and a channel name) included in the decoded additional information, to be output to and displayed on the display apparatus 190. The control unit 110 may selectively output the decoded additional information to be displayed to the display unit 150 and the display apparatus 190. For example, the control unit 110 may allow the decoded additional information to be output to and displayed on one or both of the display unit 150 and the display apparatus 190.

The control unit 110 may provide a visual feedback and/or an acoustic feedback in response to selection of the output mode 191*c* in which the broadcast receiving apparatus 100 outputs audio and the display apparatus 190 outputs audio, video, and/or additional information. The visual feedback may be provided through the display unit 150. In addition, the acoustic feedback may be provided through the built-in speaker 155 or the additional speaker 195.

For example, among the decoded audio, video, and/or additional information, the control unit 110 outputs the decoded audio to the built-in speaker 155 in response to the output mode 191c in which the broadcast receiving apparatus 100 outputs audio and the display apparatus 190 outputs audio, video, and/or additional information. The control unit may output the decoded audio, video, and/or additional information to the display apparatus 190 in response to the output mode 191c in which the broadcast receiving apparatus 100 outputs audio and the display apparatus 190 outputs audio, video, and/or additional information. The control unit may output the decoded audio, video, and/or additional information to the display apparatus 190 and the additional speaker 195 in response to the output mode 191c in which the broadcast receiving apparatus 100 outputs audio and the display apparatus 190 outputs audio, video, and/or additional information.

In addition, the display apparatus 190 may display the decoded video 190b on its screen. The control unit 110 does not use the CEC function to power off the display apparatus 190 in response to the selected audio output mode 191c.

Figure 6C:
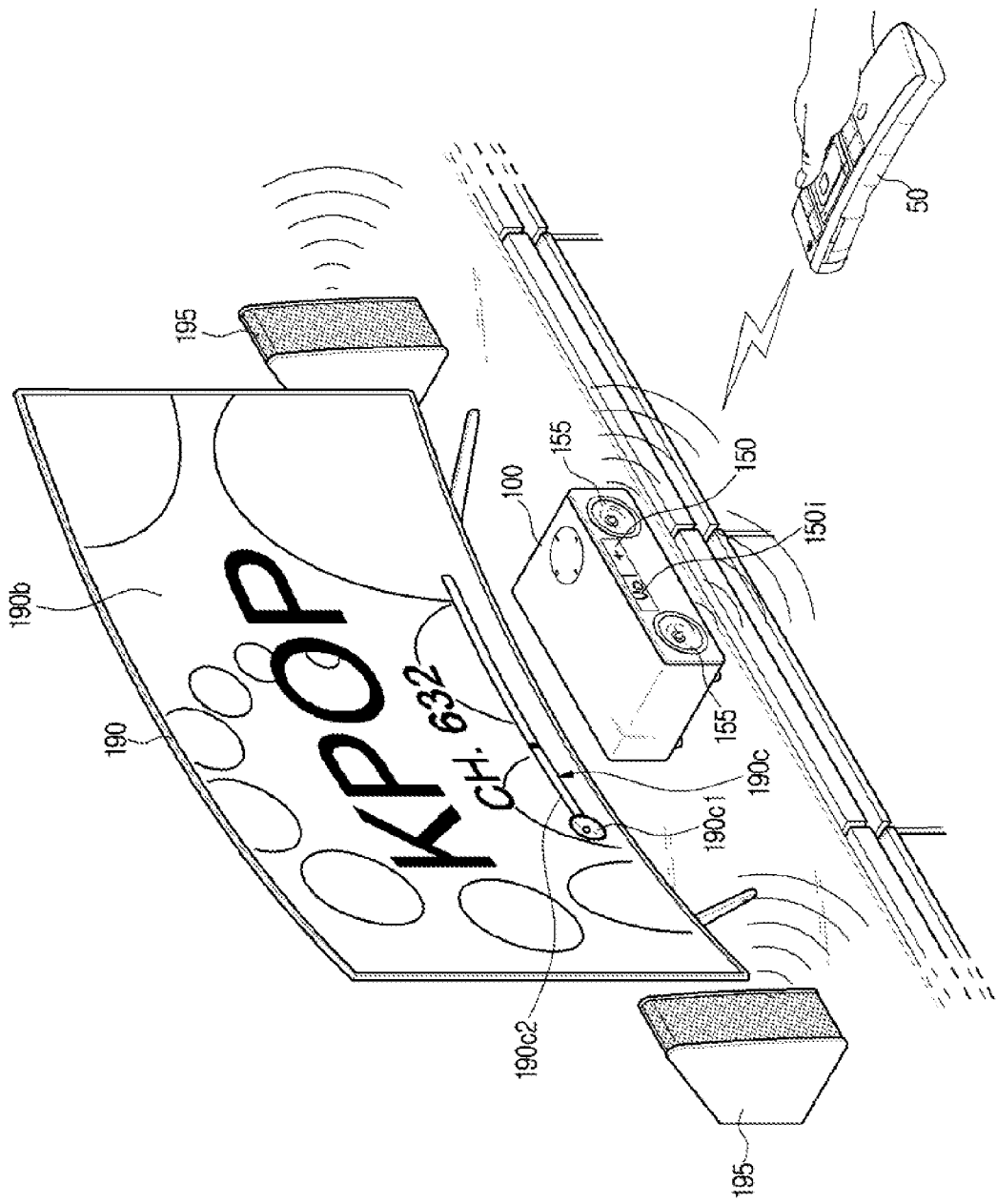

Referring to FIGS. 6B and 6C, the control unit 110 may output decoded audio through the built-in speaker 155 of the broadcast receiving apparatus 100 and output decoded audio, video, and/or additional information to the display apparatus 190.

The user may adjust a volume of the decoded audio on the broadcast receiving apparatus 100. The user may use a volume key (including a volume button) of the remote controller 50 or the broadcast receiving apparatus 100 to adjust the decoded volume.

When the volume key 57 of the remote controller 50 is selected by the user, the control unit (not shown) of the remote controller 50 outputs a volume level (including the fifth control signal) corresponding to the volume key 57 to the broadcast receiving apparatus 100 through the light output unit (not shown). The broadcast receiving apparatus 100 receives the fifth control signal output from the remote controller 50, through the light receiving unit 140. The broadcast receiving apparatus 100 may receive the fifth control signal output from the remote controller 50, through the communication unit 130. The received fifth control signal may be stored in the storage unit through control by the control unit 110 of the broadcast receiving apparatus 100.

The display unit 150 may display "Vol. +" (150i) or a volume level (e.g., 16; not shown) corresponding to the received fifth control signal through control by the control unit 110. The volume value (not shown) may be changed. In addition, the displayed "Vol. +" (150i) or a volume level (not shown) may be moved to the left or right through control by the control unit 110. Alternatively, the displayed "Vol. +" (150i) or a volume level (not shown) may flicker while being moved to the left or right through control by the control unit 110.

The control unit 110 may allow the display of a text, symbol, or image corresponding to the fifth control signal (e.g., volume adjustment) on both of the display unit 150 and the display apparatus 190.

The control unit 110 may allow the volume value 190c corresponding to the fifth control signal to be displayed on the display apparatus 190. The volume value 190c may be displayed to overlap the video 190b of the display apparatus 190.

The volume value 190c displayed on the display apparatus 190 may include a number (e.g., corresponding to the volume level), include a symbol 190c1 (e.g., a speaker) and a progress bar 190c2 (e.g., corresponding to a minimum volume level, a current volume level, and a maximum volume level), or include a symbol, a progress bar, and a number.

In step S308 of FIG. 3, when the control unit 110 outputs audio to the built-in speaker 155 of the broadcast receiving apparatus 100 and the display apparatus 190, the audio output method of the broadcast receiving apparatus 100 is completed.

Figure 8:
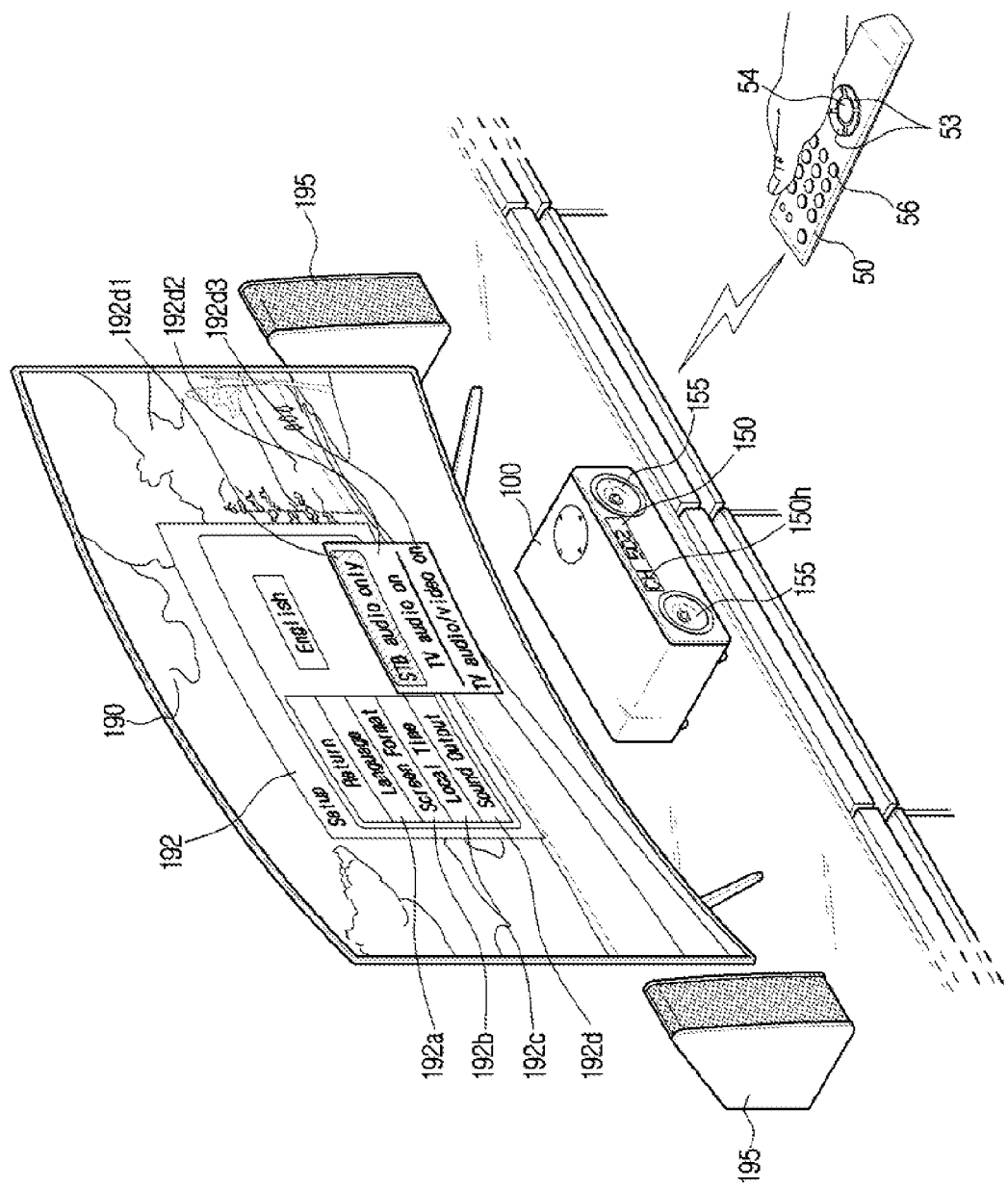
FIG. 8 is a view illustrating an example of setting an audio output mode of a broadcast receiving apparatus according to an example embodiment.

FIG. 8 is a view illustrating an example of setting an audio output mode of a broadcast receiving apparatus according to an example embodiment.

FIG. 9 is an enlarged view illustrating an example of setting an audio output mode of a broadcast receiving apparatus according to an example embodiment.

Referring to FIGS. 8 and 9, when the broadcast receiving apparatus 100 is connected to the display apparatus 190 and the menu key 56 and the navigation key 53 of the remote controller 50 are selected by the user, the control unit (not shown) of the remote controller 50 may use a communication unit (not shown) or light output unit (not shown) to output a seventh control signal (e.g., corresponding to selection of the menu key 56) to the broadcast receiving apparatus 100.

The storage unit 170 may store the received seventh control signal through control by the control unit 110.

The control unit 110 of the broadcast receiving apparatus 100 may allow the display of a pop-up 192 corresponding to a configuration setup included in a menu on a screen of the connected display apparatus 190 in response to the seventh control signal received through the communication unit 130 or the light receiving unit 140.

Items of the pop-up 192 may include a language 192a, a screen format 192b, a local time 192c, and an audio output mode 192d, which are set on the broadcast receiving apparatus 100. Items included in the audio output mode 192d may include "STB audio only" (192d1) in which only the broadcast receiving apparatus 100 outputs audio, "TV audio on" (192d2) in which both of the broadcast receiving apparatus 100 and the display apparatus 190 output audio, and "TV audio/video on" (192d3) in which the broadcast receiving apparatus 100 outputs audio and the display apparatus 190 outputs audio, video, and/or additional information. Alternatively, the items included in the audio output mode 192d may include "STB audio only" (192d1) in which only the broadcast receiving apparatus 100 outputs audio and "TV audio/video on" (192d3) in which the broadcast receiving apparatus 100 outputs audio and the display apparatus 190 outputs audio, video, and/or additional information. The items in the audio output mode 192d may include "STB audio+" (not shown) in which only the broadcast receiving apparatus 100 and the additional speaker output audio. Furthermore, the items in the audio output mode 192d may include "STB audio+mobile" (not shown) in which audio is output to a wirelessly connected external device (e.g., a cell phone, a smartphone, or a tablet) through the broadcast receiving apparatus 100 and the communication unit 130.

It will be readily understood by those skilled in the art that the items 192d1 to 192d3 included in the pop-up 192 may be changed depending on the function or structure of the broadcast receiving apparatus 100 and/or the display apparatus 190.

A user uses the navigation key 53 and/or the enter key 54 of the remote controller 50 to select one (e.g., 192d1) of the audio output modes. The control unit (not shown) of the remote controller 50 may output an eighth control signal corresponding to the selected audio output mode (e.g., the output mode in which only the broadcast receiving apparatus outputs audio) to the broadcast receiving apparatus 100.

The storage unit 170 may store the received eighth control signal through control by the control unit 110.

The control unit 110 of the broadcast receiving apparatus 100 sets the selected audio output mode 192d1 as an audio output mode of the broadcast receiving apparatus 100 in response to the received eighth control signal. The control unit 110 may assign a priority to the set audio output mode 192d1 over other audio output modes 192d2 and 192d3. For example, when the broadcast receiving apparatus 100 receives a broadcast signal (including playing back content stored in the storage unit of the broadcast receiving apparatus 100), the control unit 110 may assign a priority to the output mode in which only the broadcast receiving apparatus 100 outputs audio irrespective of power on/off of the display apparatus 190 connected to the broadcast receiving apparatus 100.

It will be readily understood by those skilled in the art that the configuration setup of the broadcast receiving apparatus 100 may be performed using the display unit 150 and the remote controller 50.

In FIG. 8, when the exit key 55 of the remote controller 50 is selected by the user, the configuration setup of the broadcast receiving apparatus 100 is completed.

The methods according to the above-described exemplary embodiments may be recorded in computer-readable media including program instructions to implement various operations embodied by a computer. The media may also include, separately or in combination, the program instructions, data files, data structures, and the like. Examples of computer-readable media include volatile or nonvolatile storage devices such as ROMs, memories such as RAMs, memory chips and devices or integrated circuits, or storage media magnetically or optically recordable and readable by a machine, for example, a computer, such as CDs, DVDs, magnetic disks or magnetic tapes regardless of deletion or re-recording capabilities.

A memory which can be included in a mobile terminal is a type of storage medium readable by a machine appropriate to store programs including instructions to implement the exemplary embodiments. The program instructions recorded in the media may be designed and configured specially for the exemplary embodiments or may be known and available to those skilled in computer software.

A broadcast receiving apparatus and an audio output method thereof can be provided in which, among audio, video, and/or additional information included in a broadcast signal received through a tuner unit and then decoded, the audio is output to a built-in speaker in response to status information (e.g., power on/off) of a connected display apparatus.

A broadcast receiving apparatus and an audio output method thereof can be provided in which, among audio, video, and/or additional information included in a broadcast signal received through a tuner unit and then decoded, the audio is output to a built-in speaker, an additional speaker, and the display apparatus in response to status information of a connected display apparatus.

A broadcast receiving apparatus and an audio output method thereof can be provided in which, among audio, video, and/or additional information included in a broadcast signal received through a tuner unit and then decoded, the audio is output to at least one of a built-in speaker, an additional speaker, and the display apparatus in response to status information of a connected display apparatus.

A broadcast receiving apparatus and an audio output method thereof can be provided in which, among audio, video, and/or additional information included in a broadcast signal received through a tuner unit and then decoded, the audio is output to a built-in speaker in response to power-off of a connected display apparatus.

A broadcast receiving apparatus and an audio output method thereof can be provided in which audio included in content received through a communication unit and then decoded is output to a built-in speaker in response to power-off of a connected display apparatus.

A broadcast receiving apparatus and an audio output method thereof can be provided in which, among audio, video, and/or additional information included in a broadcast signal received through a tuner unit and then decoded, the audio is output to a built-in speaker and an additional speaker in response to power-off of a connected display apparatus.

A broadcast receiving apparatus and an audio output method thereof can be provided in which, among audio, video, and/or additional information included in a broadcast signal received through a tuner unit and then decoded, the audio is output to a built-in speaker, and the audio and/or the additional information are/is output to a display apparatus in response to power-on of a connected display apparatus.

A broadcast receiving apparatus and an audio output method thereof can be provided in which, among audio, video, and/or additional information included in a broadcast signal received through a tuner unit and then decoded, the audio is output to a built-in speaker, and the audio, the video, and/or the additional information are/is output to a display apparatus in response to power-on of a connected display apparatus.

A broadcast receiving apparatus and an audio output method thereof can be provided in which, among audio, video, and/or additional information included in a broadcast signal received through a tuner unit and then decoded, the audio is output to a built-in speaker and an additional speaker, and the audio, the video, and/or the additional information are/is output to a display apparatus in response to power-on of a connected display apparatus.

A broadcast receiving apparatus and an audio output method thereof can be provided in which audio included in a broadcast signal received through a tuner unit and then decoded is output to a built-in speaker of the broadcast receiving apparatus.

A broadcast receiving apparatus and an audio output method thereof can be provided in which audio included in a broadcast signal received through a tuner unit and then decoded is output through a built-in speaker by the broadcast receiving apparatus connected to a display apparatus that is powered off.

A broadcast receiving apparatus and an audio output method thereof can be provided in which audio included in a broadcast signal received through a tuner unit and then decoded is output to a built-in speaker, having 4 channels or more, of the broadcast receiving apparatus and thus a space needed to install a separate speaker can be saved.

A broadcast receiving apparatus and an audio output method thereof can be provided in which audio included in a broadcast signal received through a tuner unit and then decoded is output to a built-in speaker, having 4 channels or more, of the broadcast receiving apparatus and thus power needed to install a separate speaker can be saved.

Furthermore, according to various example embodiments, a broadcast receiving apparatus and an audio output method thereof can be provided in which, among audio, a video, and/or additional information included in a broadcast signal received through a tuner unit and then decoded, the audio is output to a built-in speaker in response to status information of a connected display apparatus.

While example embodiments have been shown and described with reference to the accompanying drawings, it will be apparent to those skilled in the art that various modifications and variations can be made from the foregoing descriptions.

Thus, other implementations, alternatives and equivalents to the embodiments are within the scope of the appended claims.

What is claimed is:

1. A broadcast receiving apparatus comprising:
   a tuner;
   an input/output interface connected to an external display apparatus;
   a built-in speaker; and
   a controller configured to control the tuner, the input/output interface, and the built-in speaker, and to detect status information of the external display apparatus through the input/output interface,
   wherein the controller is configured to decode a signal received through the tuner and output audio included in the decoded broadcast signal so that when the status information of the external display apparatus indicates a power-on state the controller is configured to output the audio to the built-in speaker of the broadcast receiving apparatus and to a built-in speaker of the external display apparatus or only to the built-in speaker of the broadcast receiving apparatus, and when the status information of the external display apparatus indicates a power-off state the controller is configured to output the audio only to the built-in speaker of the broadcast receiving apparatus.

2. The broadcast receiving apparatus of claim 1, further comprising a communication circuit connected to an external apparatus,
   wherein the controller is configured to decode content received through the communication circuit and output audio included in the decoded content to the built-in speaker through the input/output interface in response to the detected status information of the external display apparatus.

3. The broadcast receiving apparatus of claim 1, further comprising a light receiving device configured to receive an optical signal output from a remote controller,
   wherein the controller is configured to control the broadcast receiving apparatus in response to a control signal received through the light receiving device.

4. The broadcast receiving apparatus of claim 1, further comprising a display,
   wherein the controller is configured to control display of information included in the decoded broadcast signal on the display in response to the status information of the external display apparatus.

5. The broadcast receiving apparatus of claim 1, wherein the controller is configured to detect the status information of the external display apparatus using consumer electronics control (CEC), and
   the status information including power-on or power-off states of the external display apparatus.

6. The broadcast receiving apparatus of claim 1, wherein the input/output interface is configured to be connected to an additional speaker, and the controller is configured to selectively output audio included in the decoded broadcast signal to the built-in speaker of the broadcast receiving apparatus, the additional speaker, and a built-in speaker of the external display apparatus in response to the status information of the external display apparatus.

7. The broadcast receiving apparatus of claim 6, wherein the controller is configured to output decoded audio in response to the number of speakers or the number of additional speakers.

8. The broadcast receiving apparatus of claim 1, wherein, when the status information of the external display apparatus indicates a power-on state, the controller is configured to output the decoded broadcast signal to the external display apparatus to display video included in the decoded broadcast signal on a screen of the external display apparatus and output audio included in the decoded broadcast signal to a built-in speaker of the external display apparatus.

9. The broadcast receiving apparatus of claim 8, wherein the controller is configured to selectively display additional information included in the decoded broadcast signal on one of the screen of the external display apparatus and a display unit of the broadcast receiving apparatus.

10. The broadcast receiving apparatus of claim 1, wherein, when the status information of the external display apparatus indicates a power-on state, the controller is configured to output audio included in the decoded broadcast signal only to the built-in speaker of the external display apparatus.

11. The broadcast receiving apparatus of claim 1, wherein the controller is configured to provide one of a visual feedback and an acoustic feedback in response to an output of audio included in the decoded broadcast signal to the built-in speaker.

12. A broadcast receiving apparatus comprising:
    a tuner;
    an input/output interface configured to be connected to a display apparatus having a speaker;
    a built-in speaker; and
    a controller configured to control the tuner, the input/output interface, and the built-in speaker, and to detect status information of the external display apparatus through the input/output interface,
    wherein the controller is configured to process a signal received through the tuner and output audio included in the processed broadcast signal to one of the built-in speaker and the display apparatus in response to a selection signal so that when the status information of the external display apparatus indicates a power-on state the controller is configured to output the audio to the built-in speaker of the broadcast receiving apparatus and to a built-in speaker of the external display apparatus or only to the built-in speaker of the broadcast receiving apparatus, and when the status information of the external display apparatus indicates a power-off state the controller is configured to output the audio only to the built-in speaker of the broadcast receiving apparatus.

13. The broadcast receiving apparatus of claim 12, wherein the controller is configured to display a pop-up corresponding to an output of the audio to one of the built-in speaker and the display apparatus, and the output of the audio to one of the built-in speaker and the display apparatus is based on a selection signal received through a remote controller.

14. An audio output method of a broadcast receiving apparatus, the audio output method comprising:
    decoding a received broadcast signal in response to a broadcast channel selected on the broadcast receiving apparatus connected to a display apparatus;

detecting status information of the display apparatus;

selectively outputting audio included in the decoded broadcast signal in response to the detected status information of the display apparatus, wherein when the status information of the display apparatus indicates a power-on state the controller is configured to output the audio to the built-in speaker of the broadcast receiving apparatus and to a built-in speaker of the display apparatus or only to the built-in speaker of the broadcast receiving apparatus, and when the status information of the display apparatus indicates a power-off state the controller is configured to output the audio only to the built-in speaker of the broadcast receiving apparatus wherein the status information of the display apparatus is detected using consumer electronics control (CEC).

15. The audio output method of claim 14, wherein the status information includes power-on or power-off states of the display apparatus.

16. The audio output method of claim 14, wherein the selective outputting of audio comprises outputting the audio through at least one of the built-in speaker of the broadcast receiving apparatus, an additional speaker, and a built-in speaker of the display apparatus.

17. The audio output method of claim 14, wherein the broadcast channel is selected by a remote controller that outputs an optical signal to a light receiving device of the broadcast receiving apparatus.

18. The audio output method of claim 14, wherein the broadcast channel includes an audio broadcast channel.

19. A broadcast receiving apparatus comprising:
a tuner;
an input/output interface connected to an external display apparatus having a speaker;
a built-in speaker;
a controller configured to control the tuner unit, the input/output interface, and the built-in speaker, and to detect status information of the external display apparatus through the input/output interface wherein the controller is configured to process a broadcast signal received through the tuner and output audio included in the processed broadcast signal to both of the built-in speaker and the external display apparatus in response to a selection signal so that when the status information of the external display apparatus indicates a power-on state the controller is configured to output the audio to the built-in speaker of the broadcast receiving apparatus and to a built-in speaker of the external display apparatus or only to the built-in speaker of the broadcast receiving apparatus, and when the status information of the external display apparatus indicates a power-off state the controller is configured to output the audio only to the built-in speaker of the broadcast receiving apparatus.

20. The broadcast receiving apparatus of claim 19, wherein the controller is configured to display a pop-up corresponding to an output of the audio to both of the built-in speaker and the display apparatus, and is further configured to provide the output of the audio to both of the built-in speaker and the display apparatus in response to a selection signal received through a remote controller.

* * * * *